United States Patent
El-Beltagy et al.

(10) Patent No.: US 9,413,823 B2
(45) Date of Patent: Aug. 9, 2016

(54) METHOD AND DEVICE FOR PEER ARRANGEMENT IN MULTIPLE SUBSTREAM UPLOAD P2P OVERLAY NETWORKS

(71) Applicant: HIVE STREAMING AB, Stockholm (SE)

(72) Inventors: Mohammed El-Beltagy, Stockholm (SE); Fouad Essayadi, Stockholm (SE); Amgad Naiem, Stockholm (SE)

(73) Assignee: Hive Streaming AB, Stockholm (SE)

( * ) Notice: Subject to any disclaimer, the term of this patent is extended or adjusted under 35 U.S.C. 154(b) by 488 days.

(21) Appl. No.: 13/842,434

(22) Filed: Mar. 15, 2013

(65) Prior Publication Data

US 2014/0280563 A1  Sep. 18, 2014

(51) Int. Cl.
*H04L 29/08* (2006.01)

(52) U.S. Cl.
CPC .......... *H04L 67/108* (2013.01); *H04L 67/1046* (2013.01); *H04L 67/1063* (2013.01); *H04L 67/1068* (2013.01); *H04L 67/1076* (2013.01); *H04L 67/1089* (2013.01)

(58) Field of Classification Search
CPC ................... H04L 29/08396; H04L 29/08423; H04L 67/104; G06F 17/30206
USPC ................................. 709/204, 205, 206, 231
See application file for complete search history.

(56) References Cited

U.S. PATENT DOCUMENTS

| | | | | |
|---|---|---|---|---|
| 5,956,716 | A * | 9/1999 | Kenner ............. | G06F 17/30017 |
| 7,165,050 | B2 * | 1/2007 | Marking ............ | G06Q 20/3829 369/30.8 |
| 8,458,333 | B1 * | 6/2013 | Stoica ................... | H04L 67/104 709/223 |
| 8,713,194 | B2 * | 4/2014 | El-Beltagy .......... | H04L 67/1078 709/201 |
| 2004/0143672 | A1 * | 7/2004 | Padmanabham .. | H04L 29/06027 709/231 |
| 2005/0283530 | A1 * | 12/2005 | O'Neal ............... | H04L 12/1854 709/224 |
| 2006/0064383 | A1 * | 3/2006 | Marking ............ | G06Q 20/3829 705/57 |
| 2006/0190615 | A1 * | 8/2006 | Panwar ............. | H04L 29/06027 709/231 |
| 2007/0192798 | A1 * | 8/2007 | Morgan ............. | H04L 63/0272 725/51 |

(Continued)

OTHER PUBLICATIONS

Roberto Roverso et al: "On the feasibility of centrally-coordinated Peer-to-Peer live streaming", Consumer Communications and Networking Conference (CCNC), 2011 IEEE, IEEE, Jan. 9, 2011, pp. 1061-1065, XP031865842, DOI: 10.1109/CCNC.2011.5766328 ISBN: 978-1-4244-8789-9.*

(Continued)

*Primary Examiner* — Backhean Tiv
(74) *Attorney, Agent, or Firm* — Volpe and Koenig, P.C.

(57) ABSTRACT

The present invention relates to a method of, and device for, arranging a P2P network comprising a streaming source and network peers arranged at distribution levels in the P2P network, in which P2P network the streaming source is arranged to divide data content to be streamed into a plurality of content sub-streams together forming the data content and to distribute the plurality of content sub-streams to the network peers. The method comprises instructing a network peer requesting to download data content to download a single content sub-stream from a respective one of selected network peers being arranged at a distribution level closer to the streaming source than the requesting network peer until a number of content sub-streams have been downloaded by the requesting network peer from which the requested data content can be formed.
The present invention further relates to a method of requesting data content in a P2P network and a peer device.

56 Claims, 16 Drawing Sheets

(56) References Cited

U.S. PATENT DOCUMENTS

| | | | |
|---|---|---|---|
| 2007/0239759 A1* | 10/2007 | Shen | G06F 17/30094 |
| 2008/0016201 A1* | 1/2008 | Thompson | H04L 47/10 709/223 |
| 2008/0062870 A1* | 3/2008 | Clower | H04L 61/1582 370/230 |
| 2008/0071907 A1* | 3/2008 | Thompson | H04L 67/104 709/224 |
| 2008/0289006 A1* | 11/2008 | Hock | H04L 63/08 726/4 |
| 2009/0077254 A1* | 3/2009 | Darcie | H04N 21/4788 709/231 |
| 2009/0119734 A1* | 5/2009 | Deshpande | H04N 7/17318 725/118 |
| 2009/0210697 A1* | 8/2009 | Chen | H04L 9/0861 713/153 |
| 2009/0222515 A1* | 9/2009 | Thompson | H04L 67/104 709/203 |
| 2009/0257365 A1* | 10/2009 | Hwang | H04L 45/00 370/256 |
| 2009/0282160 A1* | 11/2009 | Wang | H04L 12/18 709/231 |
| 2010/0005185 A1* | 1/2010 | Liu | H04L 67/104 709/231 |
| 2010/0011103 A1* | 1/2010 | Luzzatti | H04L 29/06027 709/226 |
| 2010/0064049 A1* | 3/2010 | Magharei | H04L 67/104 709/229 |
| 2010/0098077 A1* | 4/2010 | Oertel | H04L 12/1854 370/390 |
| 2010/0146136 A1* | 6/2010 | Lou | H04L 65/80 709/231 |
| 2010/0146137 A1* | 6/2010 | Wu | H04L 67/104 709/231 |
| 2010/0153575 A1* | 6/2010 | Liu | H04L 65/605 709/231 |
| 2010/0262709 A1* | 10/2010 | Hiie | H04L 12/1827 709/231 |
| 2010/0306252 A1* | 12/2010 | Jarvis | G06F 17/30132 707/770 |
| 2010/0329126 A1* | 12/2010 | van Gassel | H04L 43/0829 370/242 |
| 2011/0060798 A1* | 3/2011 | Cho | H04L 65/4084 709/206 |
| 2011/0099228 A1* | 4/2011 | Smith | H04N 21/23103 709/205 |
| 2011/0119334 A1* | 5/2011 | Eizikovich | H04L 67/104 709/204 |
| 2011/0153835 A1* | 6/2011 | Rimac | H04L 67/104 709/227 |
| 2011/0173265 A1* | 7/2011 | Liang | H04N 7/17318 709/205 |
| 2011/0274155 A1* | 11/2011 | Noh | H04N 21/23439 375/240.01 |
| 2012/0054818 A1* | 3/2012 | Noh et al. | 725/143 |
| 2012/0106612 A1* | 5/2012 | Haywood | H04N 19/166 375/227 |
| 2012/0210014 A1* | 8/2012 | El-Beltagy | H04L 67/1044 709/231 |
| 2013/0086278 A1* | 4/2013 | Schmidt | H04L 41/5009 709/231 |
| 2013/0110931 A1* | 5/2013 | Kim | H04N 21/632 709/204 |
| 2013/0132601 A1* | 5/2013 | El-Beltagy | H04L 65/4076 709/231 |
| 2013/0132602 A1* | 5/2013 | El-Beltagy | H04L 67/1078 709/231 |
| 2014/0040353 A1* | 2/2014 | Sebastian | H04L 67/06 709/203 |
| 2014/0101326 A1* | 4/2014 | Stoica | H04L 67/1076 709/228 |
| 2014/0172943 A1* | 6/2014 | El-Beltagy | H04L 67/1008 709/202 |
| 2014/0172978 A1* | 6/2014 | El-Beltagy | H04L 67/1046 709/204 |
| 2014/0172979 A1* | 6/2014 | El-Beltagy | H04L 67/1046 709/204 |
| 2014/0173024 A1* | 6/2014 | Burba | H04L 67/1004 709/217 |
| 2014/0267571 A1* | 9/2014 | Periyannan et al. | 348/14.08 |
| 2014/0280563 A1* | 9/2014 | El-Beltagy | H04L 67/1068 709/204 |

OTHER PUBLICATIONS

Cram Cohen, Incentives Build Robustness in BitTorrent, May 22, 2003, pp. 1-5.*
Wikipedia, Conditional Probability Distribution, pp. 1-3.*
Wikipedia Sampling Distribution, pp. 1-3.*
Wikipedia, Joint Probability Distribution, pp. 1-4.*
Wikipedia, Ration, pp. 1-8.*
International Search Report with Written Opinion, International Appln. No. PCT/EP2014/053901, May 26, 2014, 10 pp.
Tara Small et al: "Scaling Laws and Tradeoffs in Peer-to-Peer Live Multimedia Streaming", ACM Multimedia 2006 & Co-Located Workshops: Oct. 23-27, 2006, Santa Barbara, California, U.S.; MM '06; Proceedings, ACM Press, [New York, NY], Jan. 2, 2006, pp. 539-548.
Geun-Hyung Kim Ed, Sergey Balandin et al: "A Study on Upload Capacity Utilization with Minimum Delay in Peer-to-Peer Streaming", Aug. 22, 2011, Smart Spaces and Next Generation Wired/ Wireless Networking, Springer Berlin Heidelberg, Berlin, Heidelberg, pp. 508-519.

* cited by examiner

# METHOD AND DEVICE FOR PEER ARRANGEMENT IN MULTIPLE SUBSTREAM UPLOAD P2P OVERLAY NETWORKS

TECHNICAL FIELD

The invention relates to a method and a device for arranging a P2P overlay network.

BACKGROUND

For live video streaming in a client-server approach, the video stream is downloaded from the streaming server (i.e. source) to the client. A video stream consists of a set of consecutive data pieces that the client periodically requests in order to play the video. A scalable live streaming service requires high streaming server bandwidth to satisfy an increasing number of clients over the internet. In order to reduce the cost of the streaming server, Peer-to-peer (P2P) live streaming has been developed. The basic concept of P2P live streaming is to make the clients, referred to as peers in this context, share the load with the streaming server.

P2P live streaming systems have gained a lot of interest in the recent years as they have the advantage of allowing a streaming source to broadcast e.g. a live video event to a large number of peers, without having to provide all the required bandwidth. This is done by making use of the peers' upload capacity to assist the streaming source in broadcasting the content to the peers.

P2P networks comprise any networks composed of entities that each provides access to a portion of their resources (e.g., processing capacity, disk storage, and/or bandwidth) to other entities. The P2P concept differs from traditional client/server architecture based networks where one or more entities (e.g., computers) are dedicated to serving the others in the network. Typically, entities in a P2P network run similar networking protocols and software. Applications for P2P networks are numerous and may for example comprise transporting and/or storing data on the Internet, such as video distribution for content owners.

Many approaches have been developed to efficiently make use of the upload capacity of the peers. These approaches can be divided into two main categories.

Tree-based systems are based on constructing one or more structured trees in an overlay network where peers at the top of each tree feed the peers below them. This approach works well when the peers do not join or leave the system at high frequency as data flow is achieved without any further messages between the peers. However, in a high churn environment, tree maintenance can be very costly and destruction and reconstruction of the tree(s) are sometimes necessary.

Mesh-based systems do not enforce a tree construction, or in other words; peer connectivity does not form a specified overlay, but the peers are connected to each other in an unstructured manner. They exchange data through so called gossip communication or by sending data request messages to each other. A disadvantage with mesh-based systems is that they can have a long setup time, as nodes need to negotiate with each other to find peers. However, many systems use the mesh-based approach as it is very robust to high churn. In such systems each peer has a number of neighbours that it potentially downloads from and failure of any neighbour is thus not as critical as in tree-based approaches.

Although individual peers take decisions locally without a global view in the mesh-based approaches, they can still reach comparable savings to tree based approaches when peer churn is considered, mainly since they do not have to carry the heavy overhead of maintaining a view of the global connectivity structure.

In a tree-based system, a video stream may be divided into a number of sub-streams or stripes. For instance, instead of having a peer download a given data content from a neighbouring peer, it can download half the content as one sub-stream from a first neighbouring peer and the other half of the content as one sub-stream from a second neighbouring peer. Such a division of data content into sub-streams has the advantage that the system can become more resilient to failures if the topology is carefully constructed. One of the known P2P systems using stripes for data content streaming is SplitStream, where topology is designed such that a single peer failure only results in the loss of a single stripe amongst its downloading peers. If sub-streams are constructed using schemes that allow for redundancy such as Multiple Descriptor Coded (MDC) and Forward Error Correction (FEC), the loss of a single stripe will not cause a major disruption in the viewing experience of an end user. A problem associated with the SplitStream approach is its relative inflexibility in connecting peers in the P2P system.

SUMMARY

An object of the present invention is to solve or at least mitigate these problems in the art.

This object is achieved in a first aspect of the present invention by a method of arranging a P2P network comprising a streaming source and network peers arranged at distribution levels in the P2P network, in which P2P network the streaming source is arranged to divide data content to be streamed into a plurality of content sub-streams together forming the data content and to distribute the plurality of content sub-streams to the network peers. The method comprises instructing a network peer requesting to download data content to download a single content sub-stream from a respective one of selected network peers being arranged at a distribution level closer to the streaming source than the requesting network peer until a number of content sub-streams have been downloaded by the requesting network peer from which the requested data content can be formed.

This object is further achieved in the first aspect of the invention by a method at a peer device for requesting data content in a P2P network comprising a streaming source and network peers arranged at distribution levels in the P2P network, in which P2P network the streaming source is arranged to divide data content to be streamed into a plurality of content sub-streams together forming the data content and to distribute the plurality of content sub-streams to the network peers. The method comprises sending, from a network peer requesting to download data content, a request to download a single content sub-stream from a respective one of selected network peers being arranged at a distribution level closer to the streaming source than the requesting network peer until a number of content sub-streams have been downloaded by the requesting network peer from which the requested data content can be formed.

This object is achieved in a second aspect of the present invention by a method of arranging a P2P network comprising a streaming source and network peers arranged at distribution levels in the P2P network, in which P2P network the streaming source is arranged to divide data content to be streamed into a plurality of content sub-streams together forming the data content and to distribute the plurality of content sub-streams to the network peers. The method comprises instructing a network peer requesting to download data content to download as many content sub-streams as possible required to form the requested data content from one of selected network peers being arranged at a distribution level closer to the streaming source than the requesting network peer, and if a sufficient number of sub-streams cannot be downloaded from said one of the selected network peers, instructing the requesting network peer to download remaining sub-streams required to form the requested data content from a further one or more of the selected network peers being arranged at a distribution level closer to the streaming source than the requesting network peer, wherein said further one of the selected network peers is depleted of requested sub-streams before a request is made to yet a further one of the selected network peers.

This object is further achieved in the second aspect of the invention by a method at a peer device for requesting data content in a P2P network comprising a streaming source and network peers arranged at distribution levels in the P2P network, in which P2P network the streaming source is arranged to divide data content to be streamed into a plurality of content sub-streams together forming the data content and to distribute the plurality of content sub-streams to the network peers. The method comprises sending, from a network peer requesting to download data content, a request to download as many content sub-streams as possible required to form the requested data content from one of selected network peers being arranged at a distribution level closer to the streaming source than the requesting network peer, and if a sufficient number of sub-streams cannot be downloaded from said one of the selected network peers, sending a request to download remaining sub-streams required to form the requested data content to a further one or more of the network peers being arranged at a distribution level closer to the streaming source than the requesting network peer, wherein said further one or more of the selected peers is depleted of requested sub-streams before a request is made to yet a further peer of the selected network peers.

The object is further attained by a tracker device and a peer device corresponding to the methods according to the first and second aspects of the present invention.

Thus, the present invention advantageously facilitates connecting peers to one another in a P2P network in a manner that efficiently exploits all available peer bandwidth while at the same time arranging the peers in an overlay that is resilient to failure. By dividing the data content into a number of sub-streams/stripes, peers are allowed to upload a subset of the data content stream even if the peer upload bandwidth is less than the playback streaming rate. Further, the P2P network becomes highly resilient to failures, in particular if error correction algorithms such as MDC and/or FEC are used since a missing sub-stream can be generated from the remaining sub-streams. Thus, if any peer in the network fails, the other peers downloading from the failing peer will not be affected since they depend on the failing peer with one sub-stream only and can generate the lost sub-stream from the remaining sub-streams until overlay maintenance is undertaken and the failure is taken care of. Overlay maintenance is done periodically and in practice, the overlay network is rebuilt from the top levels, i.e. those closest to the streaming source, and peers are added to the lower layers while system constraints are preserved.

The concept of multiple requests is introduced throughout the embodiments of the present invention. Instead of selecting one of a plurality of neighbouring peers as recipient of a download request, and falling back on the streaming source if the download request cannot be satisfied by the selected neighbouring peer because of lack of available bandwidth, or if the selected neighbouring peer simply not is arranged upstream of the entering peer, the entering peer will send the download request to another one of the neighbouring peers. If this particular neighbouring peer does not have available bandwidth, the entering peer will send the download request to a further neighbouring peer, and so on, until the entering peer is considered to have depleted its requests, whereupon it will fall back on the streaming source for the requested content. In practice, the tracker may have to stipulate an upper limit for the number of download requests that can be made to different neighbouring peers, as the delay from the time of sending the first download request to the point in time when the requested content actually can be rendered by the entering peer may become unacceptably long.

Thus, by allowing multiple download attempts directed to neighbouring peers, in case a selected neighboring peer is prevented from uploading the requested data content, either due to exceeded latency requirements or due to lack of free upload capacity, a further neighbouring peer is advantageously approached and a download request is made to the further neighbouring peer. Should the further neighbouring peer be prevented from uploading the requested data, still a further neighbouring peer is approached, and so on. This will ultimately increase the expected probability that an entering peer actually will download the requested data content from any one of the neighbouring peers provided by the tracker. Analogously, the risk of having the entering peer fall back on the streaming server for requested data decreases and the savings are consequently increased.

As further has been mentioned, the concept of using stripes or sub-streams is introduced.

In the first aspect of the present invention, a requesting peer downloads a single stripe from a respective one of a number of selected neighbouring peers being arranged at a distribution level closer to the streaming source than the requesting network peer until a sufficient number of stripes have been downloaded. This is undertaken even if the uploading peer(s) has capacity to upload further stripe(s). Advantageously, this creates diversity and makes the network more resistant to failure; if for some reason a peer fails to upload a requested content stripe, only this single content stripe (out of a number of stripes) is lacking. Further advantageous is that a peer that requests data content will turn to an upstream-located peer, i.e. a peer arranged at a distribution level closer to the streaming source, which will result in smaller playback delays with respect to a real-time playback point of the data content distributed by the streaming source. In other words, with respect to a real-time playback point of the data content distributed by the streaming source, peers arranged further downstream in the P2P network will have a greater latency, while peers arranged further upstream will have a smaller latency.

In the second aspect of the present invention, a requesting peer downloads all stripes from one and the same uploading peer, implying that a requesting peer advantageously will have fast access to requested content. Should the downloading/requesting peer deplete one of its uploading peers, it will download as many stripes as possible from the depleted peer and then move on to a next peer and continue to download the requested stripes.

Embodiments of the present invention are defined by the dependent claims.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
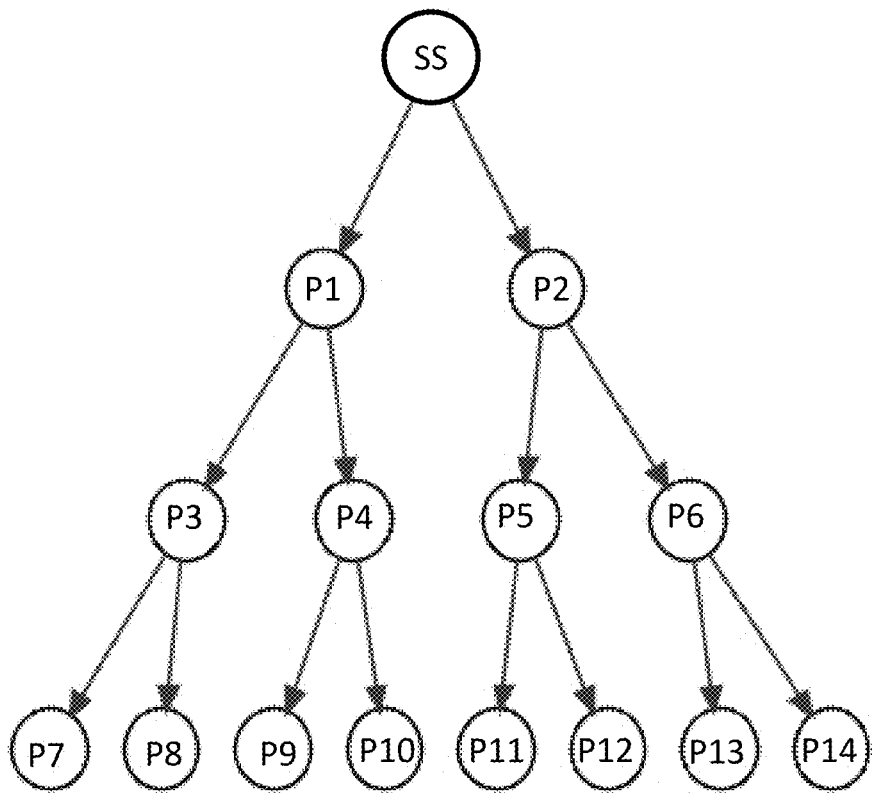
FIG. 1 illustrates a prior art P2P network with a single tree overlay.

FIG. 1 exemplifies a prior art P2P network with a single tree overlay. As can be seen, peers (in practice peer devices such as television sets, mobile phones, computers, etc.) are arranged in distribution layers/levels in relation to a streaming source in the form of a streaming server SS. Thus, two peers are arranged at distribution level 1, i.e. the level closest to streaming source S, four peers are arranged at distribution level 2 and eight peers are arranged at distribution level 3. To illustrate, the streaming source S distributes a given data content to peer P1, which in its turn distributes the data content to peers P3 and P4. Finally, peer P3 distributes the given data content to both peers P7 and P8, while peer P4 distributed the data content to peers P9 and P10.

Hence, in such a prior art P2P live streaming network, each peer entering the network will ask a device known as a tracker (not shown) for the latest piece of data content to start streaming from as well as k randomly selected peers to be its neighbours. Then, the entering peer will turn to its neighbours for the latest piece of data content, and if it finds the required data content on any neighbouring peer, it will start streaming from that neighbouring peer. Due to network delay and asynchronicity, the entering peer will be delayed by at least the full duration of one piece of data content from its uploader and at least twice that from the streaming server on condition that the entering peer's uploader is delayed by at least the full duration of one piece of data content from the source. In other words, with respect to a real-time playback point RT of the data content distributed by the streaming source, the entering peer will have a latency of at least two pieces of data content, while its uploader will have a latency of at least one piece of data content. If the entering peer cannot find the latest piece of data content on one of its neighbouring peers, it will download it from the streaming server. As compared to a traditional client-server network, where the server distributes content to all clients in the network, savings in streaming server load of the P2P network in FIG. 1 is 12/14=0.86. That is, instead of streaming content to all 14 peers, the streaming server S streams content to two of the peers, which in their turn unload the server by streaming content to the remaining 12 peers, at the expense of network latency.

It should be noted that in most P2P networks for live streaming peers, the peers have a buffer that allows for continuous playback even if there are some interruptions in the downloaded data pieces. In fact, a given distribution level may contain peers which are slightly behind or ahead (due to e.g. delay variations and asynchronicity) the other peers at the same level in terms of absolute latency, but still within a carefully chosen tolerance such that it safely can be asserted that, with respect to playback of the peers that are positioned at the next downstream level, all peers at the upstream level always possess content that is useful for the downstream uploaders in a manner that will not induce playback interruptions. In practice, there may be some fluctuation in the latencies. Thus, in line with that described in the above, a peer with a latency in the range 250-350 ms could be positioned at the first level, a peer with a latency in the range 550-650 ms could be positioned at the second level, etc.

Figure 2:
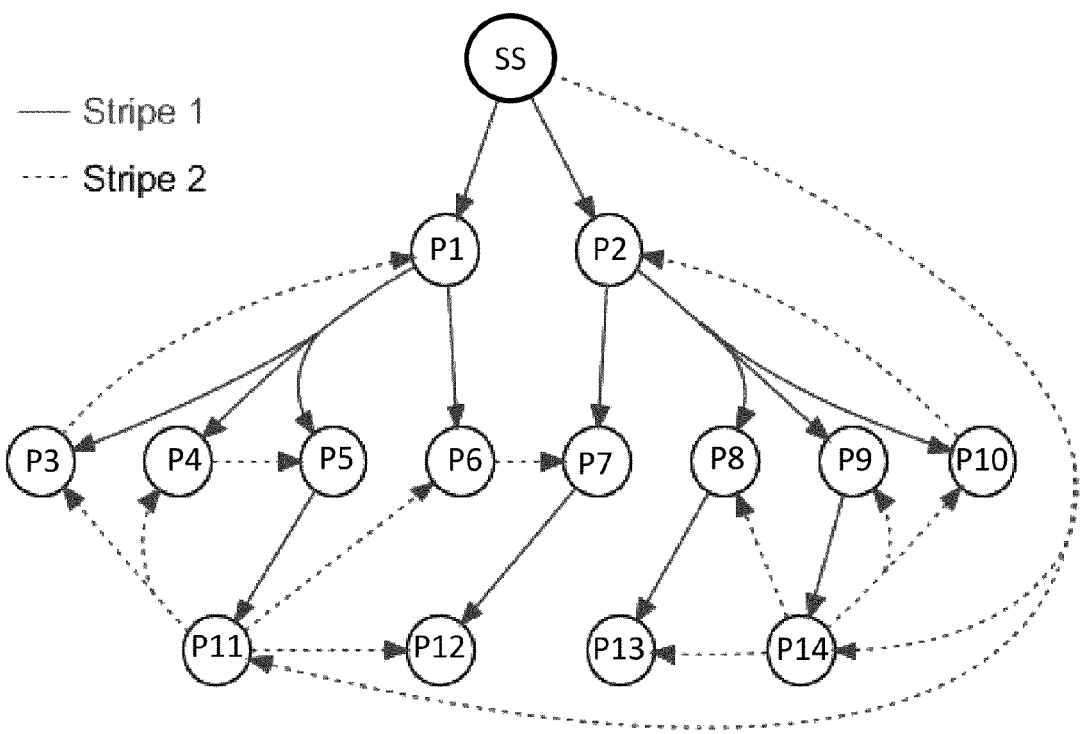
FIG. 2 shows the P2P network of FIG. 1, but in which a SplitStream overlay construction approach is used.

FIG. 2 shows the P2P network of FIG. 1, but in which the SplitStream overlay construction approach is used. The main advantage of this approach is the utilization of the upload bandwidth of all the peers in the network. For instance, it can be seen that in contrast to the single tree overlay of FIG. 1, at least some of the peers at the last distribution level are not idle and their upload capacity is indeed utilized. This is a more effective approach in terms of bandwidth utilization. However, in comparison to the overlay construction of FIG. 1, the SplitStream approach may have the effect that some of the peers that were close to the source S now are further away from the source in terms of distribution layers (i.e. they will have a greater playback delay), while other peers that were further away from the source now are closer. The number of distribution layers from the streaming source will however not increase. As previously mentioned, this approach utilizes content sub-streams also referred to as stripes. Thus, a content stream is divided into a number of sub-streams sometimes referred to as stripes. For instance, if the content stream rate is 1 Mbps, and 4 stripes are used to distribute the content, each stripe would constitute a sub-stream of 256 kbps. Given a peer with an upload capacity of 1.5 Mbps which distributes data to six other peers with a maximum upload capacity of 256 kbps, this peer is said to have six "seats" since it can upload six stripes simultaneously to other peers with a predetermined upload bandwidth. The division of bandwidth and seats is made such that a peer arranging device in the P2P overlay network is provided with a simple model of the bandwidth/upload capacities of the peers. In a case where data of an original stream is spread over a number of sub-streams, where none of the sub-streams comprises overlapping data, each peer needs to be downloading all the sub-streams in order to be able to completely reconstruct the original stream. Such a system more effectively exploits the capacity of each and every peer in the network.

In FIG. 2, the original stream is divided into two stripes, where stripe 1 is denoted by means of continuous lines and stripe 2 is denoted by means of dashed lines. It can be seen that each peer downloads both stripe 1 and stripe 2 such that the original stream can be reconstructed. In terms of playback delay, consider the following: for peers P1 and P2 in FIG. 1, the delay for playing back a piece of content with respect to source real-time playback point is T, the delay for P3-P6 is 2×T, and the delay for P7-P14 is 3×T, and so on.

Assuming that the bandwidth of each peer in FIG. 2 is the same as that for FIG. 1, stripe 1 will be uploaded to P1 from streaming source S in T, but stripe 2 on the other hand will be uploaded to P1 via P11 and P3. Given that the piece of content of FIG. 1 corresponds to a concatenation of stripe 1 and stripe 2 in FIG. 2, the delay for P1 would thus amount to 3T for the same piece of content. An analogue reasoning can be made for P2. On the other hand, in case of e.g. P6, stripe 1 will be uploaded from S via P1 in time T+T=2T, and stripe 2 will be uploaded via P11 and P6 in time T+T (given that P6 has the capacity to simultaneous upload stripe 1 from P1 and stripe 2 from P11). It will thus take 2T to upload stripe 1+stripe 2. The delay for P6 would thus amount to T for the same piece of content. Consequently, when comparing the overlay of FIG. 2 with that of FIG. 1, P1 will experience a longer delay than P6.

However, since all peers in the overlay of FIG. 2 are capable of distributing data content, savings in streaming source bandwidth will increase. The implementation of this approach however requires a Distributed Hash Table (DHT) implementation which adds an additional load and requires processing to achieve load balancing and high performance in the network. In addition, the SplitStream approach does not handle variable bandwidth among peers and thus assume that all the peers in the network have the same upload bandwidth.

Figure 3:
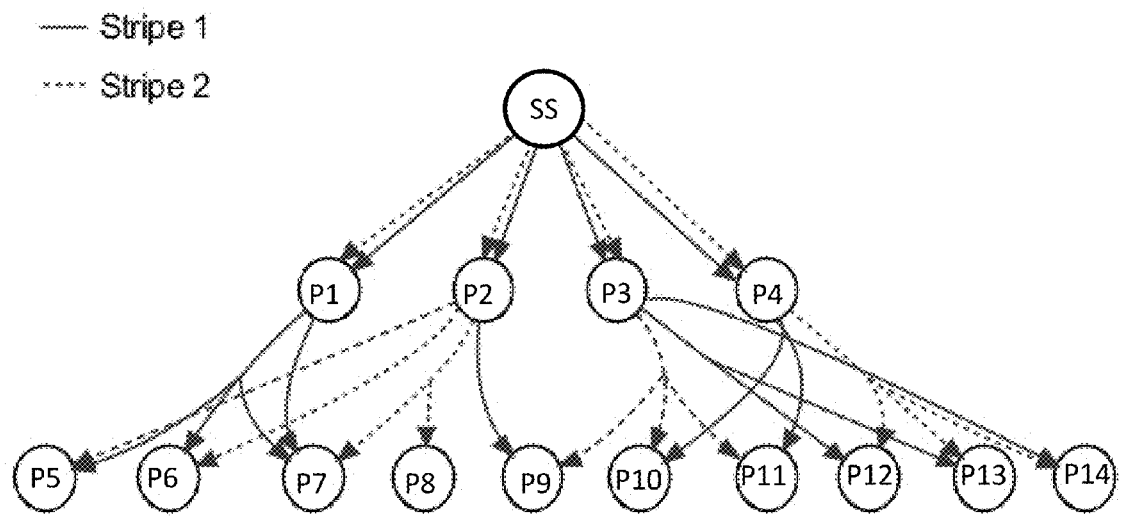
FIG. 3 illustrates the P2P network set forth in FIGS. 1 and 2, but where the peers have been arranged in an overlay network in accordance with an embodiment of a first aspect of the present invention.

FIG. 3 illustrates the P2P network set forth in FIGS. 1 and 2, but where the peers have been arranged in an overlay network in accordance with an embodiment of the first aspect of the present invention. As previously have been mentioned, a major advantage of the overlay construction of embodiments of the first aspect of the present invention is that a peer that requests data content will turn to an upstream-located peer, i.e. a peer arranged at a distribution level closer to the streaming source. In contrast to e.g. the SplitStream approach, this will result in smaller playback delays with respect to a real-time playback point RT of the data content distributed by the streaming source. In other words, with respect to a real-time playback point RT of the data content distributed by the streaming source, peers arranged further downstream in the P2P network will have a greater latency, while peers arranged further upstream will have a smaller latency. With reference to FIG. 3, it can e.g. be seen that peers P12, P13 and P14 downloads stripe 1 and stripe 2 from uploading peers P3 and P4, respectively located at a distribution level closer to the streaming source S. Further, advantageous is that each requesting peer downloads a single stripe from an uploading peer even though the uploading peer has capacity to upload further stripe(s). Again with reference to FIG. 3, it can be seen that peers P12, P13 and P14 makes a single-stripe download of stripe 1 and stripe 2 from uploading peers P3 and P4, respectively. This creates diversity and makes the network more resistant to failure; if for some reason a peer fails to upload a requested content stripe, only this single content stripe (out of a number of stripes) is lacking. It should be noted that "requesting peer" and "entering peer" will be used interchangeably throughout the description, both denoting a network peer requesting to download data content.

If sub-streams are constructed using schemes that allow for redundancy such as Multiple Descriptor Coded (MDC) and Forward Error Correction (FEC), the loss of a single stripe will not cause a major disruption in the viewing experience of an end user.

Thus, in the downloading approach according to the first aspect of the present invention, each requesting peer takes only one stripe from a given uploading peer for each request it makes, i.e. if a download request is accepted, only one stripe is downloaded even if the uploading peer has enough bandwidth to upload more than one stripe. This results in diversity for each stripe for each peer and downloading all the stripes from one source is avoided. If the requesting peer cannot find an uploading peer which can supply the requesting peer with a requested stripe, the requesting peer will have to turn to the streaming source (unless the requesting peer have enough stripes to form the requested data content).

Figure 4:
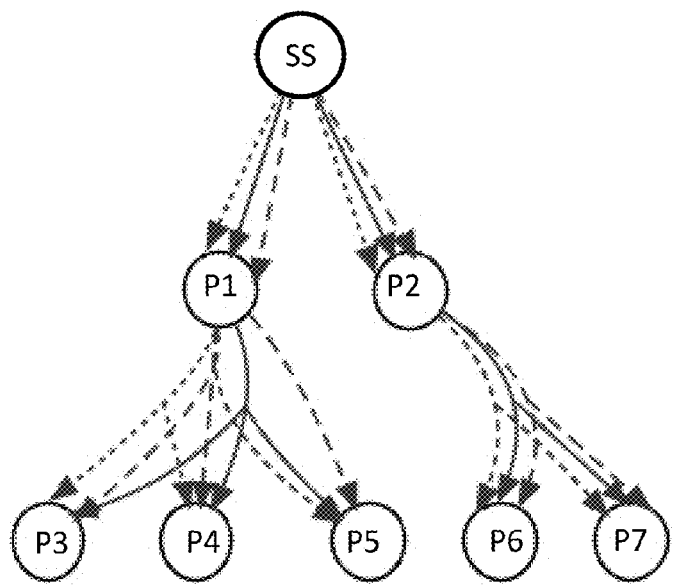
FIG. 4 illustrates an alternative P2P network where the peers have been arranged in an overlay network in accordance with an embodiment of a second aspect of the present invention.

FIG. 4 illustrates an alternative P2P network with fewer peers but a further content stripe 3 to distribute, where the peers have been arranged in an overlay network in accordance with an embodiment of the second aspect of the present invention. As previously have been mentioned, a major advantage of the overlay construction of embodiments of the second aspect of the present invention is that a peer that requests data content will turn to an upstream-located peer, i.e. a peer arranged at a distribution level closer to the streaming source. In contrast to e.g. the SplitStream approach, this will result in smaller playback delays with respect to a real-time playback point RT of the data content distributed by the streaming source. In other words, with respect to a real-time playback point RT of the data content distributed by the streaming source, peers arranged further downstream in the P2P network will have a greater latency, while peers arranged further upstream will have a smaller latency. With reference to FIG. 4, it can e.g. be seen that peers P3, P4 and P5 download all stripes 1, 2 and 3 from uploading peer P1 located at a distribution level closer to the streaming source S. Further, advantageous is that each requesting peer downloads all stripes from one and the same uploading peer, implying that a downloading peer quickly will have access to requested content. Should the downloading peer deplete one of its uploading peers, it will download as many stripes as possible from the depleted peer and than move on to a next peer and continue to download the requested stripes.

Further advantageous is that uploading of a fraction of a sub-stream is allowed in both the first and second aspect of the present invention. Thus, in the first aspect, if the requesting peer only is able to download say 50% of a requested stripe from a first selected peer, the requesting peer can move on to a second selected peer for requesting, and ultimately downloading, the remaining 50% of the stripe that initially was requested from the first selected peer.

In the second aspect, if the first selected peer only has the capacity to upload say 2.5 stripes out of 5 requested stripes, the requesting peer will deplete the first selected peer of its 2.5 stripes before requesting the remaining 2.5 stripes from one or more uploading peers.

Figure 5:
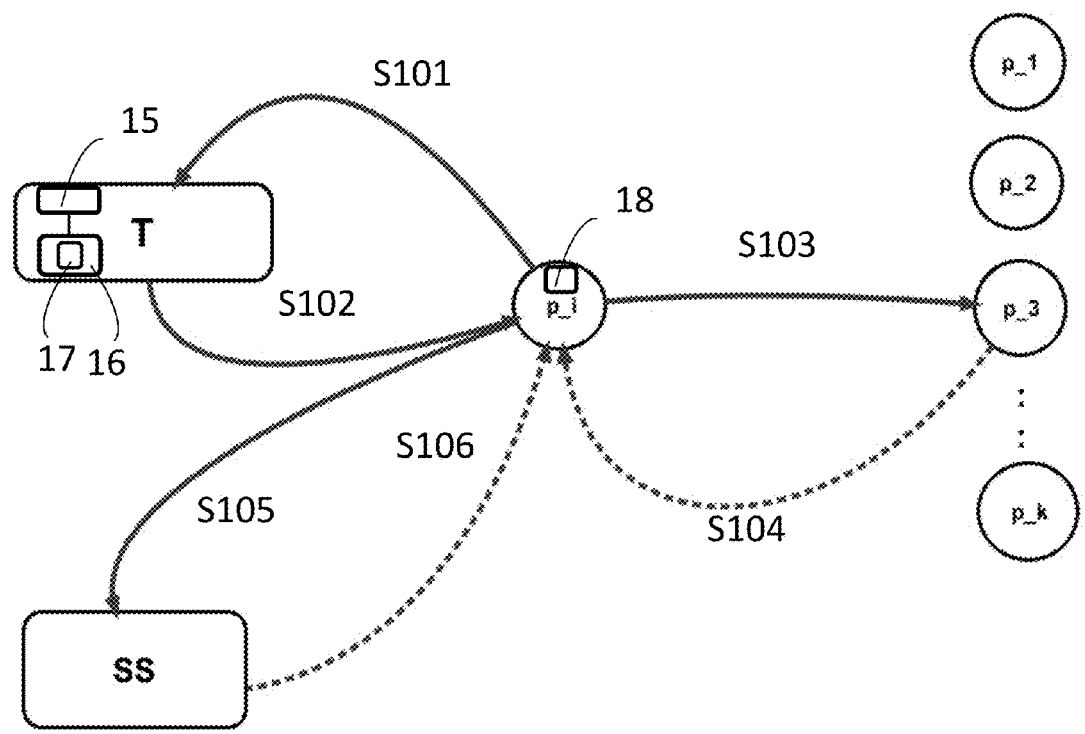
FIG. 5 illustrates a P2P network in which embodiments of the present invention could be implemented.

FIG. 5 shows a P2P network in which embodiments of the present invention could be implemented. Continuous lines denote request/reply messages, while dashed lines denote streaming channels. A new peer $p_i$ enters the network and requests the tracker T in step S101 via its communication interface CI to receive data content originally streamed from the streaming source SS. The tracker determines the level at which the entering peer $p_i$ is to be arranged and provides in step S102 the entering peer with a list of k randomly selected peers from which the data content can be downloaded as well as the assigned level of the entering peer. Thus, the entering peer requests in step S103 one of the peers on the list to supply it with the latest subset of data given the determined network level for the entering peer. If there exists at least one peer out the k selected peers which is arranged at a level closer to the streaming source than that determined for the entering peer, the requested data content will be uploaded in step S104 to the entering peer with some given probability. In FIG. 5, peer $p_3$ uploads the requested data content to the entering peer $p_i$. Depending on how the level for the entering peer is selected, the probability that a peer can upload the requested data content to the entering peer in step S104 can be increased. If no selected peer exists which is located at a level closer to the source than that determined for the entering peer, i.e. all k peers are at level which is equal to or further downstream that the level that is determined for the entering peer, the requested data content cannot be uploaded in step S104 to the entering peer. In that case, the entering peer will in step S105 turn to the streaming server SS for the requested data content, which in its turn will upload the requested data content to the entering peer in step S106. Analogously, depending on how the level for the entering peer is selected, the probability that the streaming server will have to upload the requested data content to the entering peer in step S106 can be decreased. These probabilities will be discussed in detail later on in the detailed description.

The tracker determines the distribution level $d_i$ at which an entering peer is to be arranged with respect to the streaming source SS on the basis of statistical information. The behaviour of a P2P network in which the present invention is implemented is stochastic, which is based on currently streaming network peers. Thus, statistical information should be considered such that a probability distribution that represents the behaviour of peers in the P2P live streaming network can be formed. Given the probability distribution p(d) of the distribution levels of the peers with respect to the streaming server, expected savings in the streaming server bandwidth load can be calculated. Thus, by setting a level which follows the distribution p(d) for each entering peer, the savings of the stream server will approach the expected savings calculated using the said distribution. Or to put it in another way: by determining an appropriate level at which the entering peer is to be arranged in the network, the probability that a network peer can be found from which the entering peer can download requested data content can be increased. Thus, the savings in the streaming server bandwidth is directly related to the probability that a network peer can upload requested data content to the entering peer.

With reference to FIG. 5, the tracker T for performing the method of arranging peers in a P2P network according to embodiments of the present invention, as well as the peer device $p_i$ according to embodiments of the invention, are typically equipped with one or more processing units 15, 18 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a compact disc or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc.

Figure 6:
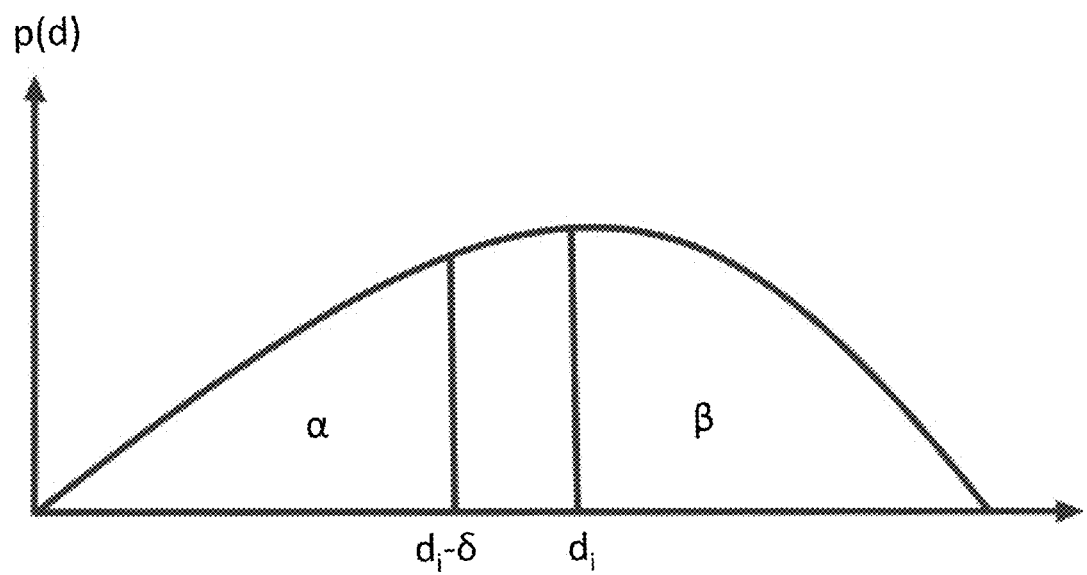
FIG. 6 illustrates a probability distribution of distribution levels of network peers.

Reference is made to FIG. 6, which shows an assumed shape for the distribution of the distribution level with respect to the streaming source. As the distribution of level values is controlled by the tracker, a relationship between the expected savings and this distribution can be formulated. In a network using a random selection policy, any entering peer $p_i$, having k randomly selected neighbors and being arranged at a certain level $d_i$ with respect to the streaming source determined by the tracker will search among its neighbors for the requested data content. If it does not find the particular data content, it will request it from the streaming server incurring a cost to the streaming server bandwidth. This undesired situation occurs when the k neighbours having the requested data content are at a level equal to or further downstream that determined for the entering peer, i.e. fall in region β or the region defined by $d_i-\delta$ to $d_i$ of the distribution p(d).

On the other hand, if one of the k neighbouring peers is arranged at a level that falls in the region α (and has enough bandwidth), then this peer can upload to the entering peer. It should be noted that region α is limited by $d_i-\delta$, where δ typically amounts to the duration of data transfer between two subsequent distribution levels. That is, if the entering peer is determined to be arranged at level three, it can download the requested data subset from a peer arranged at level two or closer to the source. Hence, an entering peer can only download from any neighbouring peer that precedes it by at least δ. Consequently, the probability $P_{\alpha_i}$ for an entering peer that a randomly selected neighbouring peer is in the region α is simply the cumulative distribution function (cdf) value of the random variable d at the value $d_i-\delta$:

$$P_{\alpha_i} = cdf(d = d_i - \delta) = \int_0^{d_i-\delta} p(x)dx \quad (1)$$

Thus, the level $d_i$ of the entering peer can be determined by the tracker using the teachings set forth in Equation (1) such that the requested data content can be downloaded from one of the k randomly selected peers with a sufficiently high probability. Hence, by carefully selecting an appropriate level for the entering peer, the possibility of having the entering peer download from one of its k neighbouring peers can be increased (or decreased, if required). A cost of having the entering peer downloading from a neighbouring peer with a higher probability is that the latency experienced by the entering peer increases. Thus, if for a given P2P live streaming network the probability of successful download from a neighbouring peer already is high, the latency may be selected by the tracker to be low with a still high download probability.

Further, this may be stipulated by a predetermined threshold value which the probability should exceed for the chance that the requested data content could be downloaded from a neighbouring peer should be considered great enough.

It can be envisaged that each peer will be given a list of k randomly selected neighbouring peers, as described hereinabove, in order to ensure that the determined latencies from the real-time playback point will concur with the probability distribution p(d) and thus do not have any bias. Further as has been described in the above, an entering peer will download from the streaming server when the respective latest fully downloaded piece of content data of each peer among the k neighbouring peers is older than the piece of data content that the entering peer is requesting. With reference to FIG. 6, this occurs if all k randomly selected neighbouring peers are placed at a level downstream of the entering peer, i.e. fall in region β of the probability distribution p(d).

The probability that all the k neighbouring peers will be in the region β can be expressed as a binomial experiment, where the probability of attaining zero success trials out of a total number k of trails is determined. By considering success probability as the probability of finding one neighbouring peer that falls in the region α, the probability $P_F$ of finding zero neighbouring peers that belong to region α out of k neighbouring peers can be expressed as a binomial experiment with x=0 as follows:

$$P_F(d_i) = Pr(X = 0 \mid k, P_{\alpha_i}) = \binom{k}{0} P^0 (1 - P_{\alpha_i})^k \quad (2)$$

$$P_F(d_i) = (1 - P_{\alpha_i})^k$$

Thus, $P_F(d_i)$ expresses the probability that a downloading peer at a determined level $d_i$ will have to stream required data content from the streaming server since no neighbouring peer out of the k randomly selected peers is located in region α of FIG. 6. Analogously, the probability that an entering peer at level $d_i$ will find at least one neighbouring peer out of the k randomly selected peers in region α (from which it may download the requested data content) can be expressed as $1-P_F(d_i)$. This presents a simple model which the tracker can use to determine level $d_i$ for an entering peer such that data content can be streamed from a neighbouring peer with a certain probability.

However, this does not take into account finite upload capacity of each one of the network peers. A situation may occur where an entering peer at level $d_i$ has found a neighbouring peer out of the k randomly selected peers in region α, but the neighbouring peer cannot upload to the entering peer due to limitations in upload capacity. In an embodiment of the present invention described in the following, the tracker takes into account the finite upload capacity of the network peers.

A discrete probability distribution p(d) will be used since the distribution levels are expressed as discrete values. Thus, the levels take on discrete values $[d_1, d_2, d_3, \ldots]$, where $d_{n+1}-d_n=\delta$ for all n. A discrete probability distribution implies that the expected number of peers at level $d_i$ are $N_i=p(d_i)N$. For any level $d_j$, the number of download requests from peers at level $d_i$ is, in case the download requests are made to the peers in region α in a random and unbiased manner:

$$R_{ij} = \begin{cases} N_{pi} \dfrac{p(d_j)}{P_{\alpha_i}} & \text{if } d_j \leq d_i - \delta \\ 0 & \text{otherwise} \end{cases} \quad (3)$$

Where $N_{pi}=(1-P_F(d_i))N_i$ is the expected number of peers at level $d_i$ that will attempt to download from peers in region α. The reason only a subset $N_{pi}$ of all peers $N_i$ at level $d_i$ will make a successful attempt to download from other peers in region α is that there is a probability that peers at level $d_i$ will have no neighbouring peers in α and hence will have to download from the streaming source.

The total number of download requests that neighbouring peers make to peers at level $d_j$ is thus:

$$R_j = \sum_{i=j+1}^{\infty} R_{ij}$$

In order to find how many of these requests will be satisfied given that the number of peers at level $d_j$ is expressed as $N_j$, each of them having a capacity of u simultaneous uploads, the probability that a peer at level $d_j$ will receive l requests for download from the total number $R_j$ of download requests as:

$$B_j(l) = \binom{R_j}{l} \left(\dfrac{1}{N_j}\right)^l \left(1 - \dfrac{1}{N_j}\right)^{R_j - l} \quad (4)$$

where u is defined as the number of simultaneous uploads per peer and is determined by bandwidth distribution $p_{bw}$ and the streaming bitrate br. The number of simultaneous uploads per peer is thus calculated as $u=p_{bw}/br$. As an example, if a given peer is assigned a bandwidth of 1 Mb/s and the streaming bit rate is 200 kB/s, the peer can simultaneously upload to five other peers.

$B_j(l)$ determines the share of peers at level $d_j$ that will receive l download requests. For l≤u, the number of successful requests will be $l \times B_j(l) \times N_j$, while for l>u, the number of successful requests will be $u \times B_j(l) \times N_j$. Thus, peers at level $d_j$ receive $R_j$ download requests, and each request will fall on one of the plurality $N_j$ of peers randomly, wherein the distribution of download requests can be modelled as a binomial distribution.

Therefore, the expected number of successful responses that peers at level $d_j$ make to random download requests from neighbouring peers (i.e. the load on peers at level $d_j$) is:

$$L_j = \left( \sum_{l=1}^{u} l B_j(l) + u \left(1 - \sum_{l=0}^{u} B_j(l)\right) \right) N_j \quad (5)$$

and hence the expected number of peers streaming from the P2P network is the total number of successful downloads:

$$L = \sum_{j=0}^{\infty} L_j.$$

The probability that a download request which a neighbouring peer makes to peers at level $d_j$ is successful can be calculated as the ratio between the expected number of successful responses and the total number of download requests, i.e. $L_j/R_j$.

Consequently, the probability that a download request from a peer at level $d_j$ will fall in region $\alpha$ is $(1-P_F(d_i))$, i.e. the probability that a peer at level $d_i$ will find at least one neighbouring peer out of the k randomly selected peers in region $\alpha$ from which it may download the requested data content can be expressed as $1-P_F(d_i)$. The probability that one of those requests to peers in region $\alpha$ actually will go to peers at the particular level $d_j$ is $p(d_j)/P\alpha_i$ (deducted from Equation (3) which defines this probability for a number $N_i$ of peers at level $d_i$). These are modelled as independent probabilities, and the probability that a peer at level $d_i$ will be able to download content from a neighbouring peer at a particular level $d_j$ (given the bandwidth limitations) can be expressed as a product of these three probabilities. It then follows that the probability that a peer at a level $d_j$ makes a successful download from the P2P network, i.e. a download from any peer at a level lower than $d_i$, will be expressed as a sum of probabilities:

$$P_s(d_i) = (1 - P_F(d_i)) \sum_{j=0}^{j=i-1} \frac{L_j}{R_j} \frac{p(d_j)}{P_{\alpha_i}}, \quad (6)$$

Hence, the summation covers all peers at a level lower than $d_i$ and not only peers at a particular level of $d_j$.

Expected streaming source savings will relate to the probability of successful download by each peer in the network:

$$\text{savings} = \sum_{i=0}^{\infty} P_s(d_i) p(d_i). \quad (7)$$

The savings can however be expressed in a simpler manner as the ratio of successful downloads to the peers in the network and the total number of peers in the network, i.e.:

$$\text{savings} = \frac{L}{N}. \quad (8)$$

This form for calculating the savings is conceptually simpler and computationally more efficient. Both Equations (7) and (8) yield the same result.

To recapitulate, the situation where a downloading peer at a determined level $d_i$ will have to stream required data content from the streaming server occurs if:
- no neighbouring peer out of the k randomly selected peers is located in region $\alpha$, i.e. no neighbouring peer is arranged at a level of $d_i-\delta$ or less, or
- one or more neighbouring peers out of the k randomly selected peers are located in region $\alpha$, but the neighbouring peers cannot upload due to limitations in upload capacity.

Thus, even though one or more neighbouring peers are capable of providing a peer with requested data content, in a single request policy as illustrated in FIG. 5, the peer will still have to revert to the streaming server in case the selected one of the k neighbouring peers is not capable of uploading the requested data content. In many live streaming situations there is little time for the peer to attempt multiple requests; in many cases, the customer wants to start viewing the content immediately. However, in the first as well as in the second aspect of the present invention, a multiple request policy is implemented.

To put it in another way, even though neighbouring peers can be located in region $\alpha$ illustrated in FIG. 6, the located neighbouring peers may be restrained from effecting an upload to the requesting peer due to bandwidth/upload capacity limitations. Equation (6) set forth in the above takes these bandwidth limitations into account and calculates $P_s(d_i)$, i.e. the probability that a peer at a level $d_i$ makes a successful download from the P2P network.

As has been previously described, for instance with reference to FIG. 5, when a peer enters the network, it receives from the tracker a list of k randomly selected neighbouring peers from which requested data content can be downloaded with an expected probability depending on a determined level at which the entering peer is to be arranged with respect to the streaming source. Thus, the entering peer is enabled to download, with the expected probability, the requested data content from a selected one of the k randomly selected peers at a lower level than that determined for the entering peer (i.e. at a level upstream from the entering peer).

The probability that the entering peer is capable of downloading the requested data content from a selected one of the plurality of randomly selected peers it thus determined on the basis of the upload capacity of the peers as well as the determined level at which the entering peer is to be arranged.

Figure 7A:
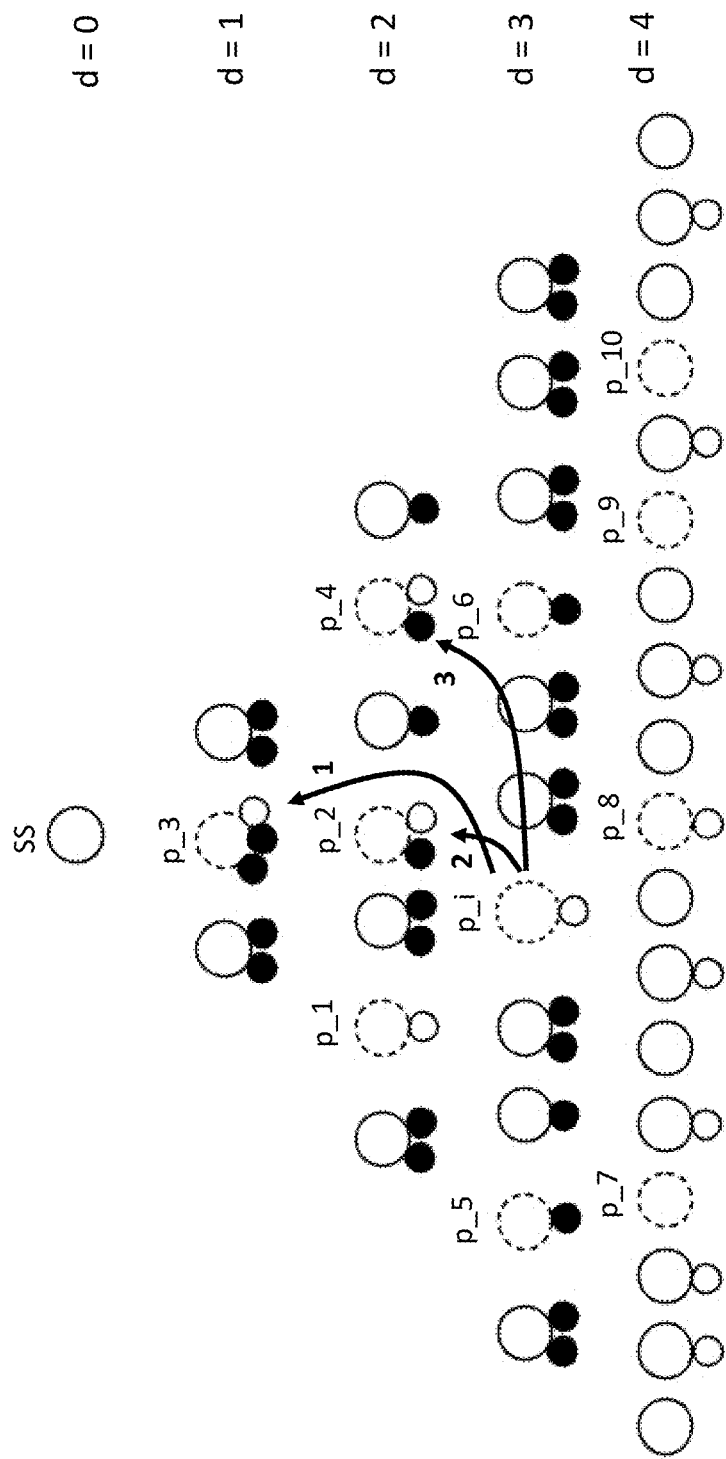
FIG. 7a illustrates an embodiment of the first aspect of the present invention where multiple requests are randomly submitted to listed network peers.

FIGS. 7a and b illustrate the first and second aspect, respectively of the present invention showing multiple requests. Thus, in a basic and straightforward selection policy, an entering peer is given a list of k neighbouring peers from the tracker, and requests are made randomly to the neighbouring peers either until the requested data content is successfully downloaded or until a maximum number of allowed download requests have been reached, or alternatively until all neighbouring peers in the $\alpha$ region have been depleted (in case this is fewer than the maximum number of allowed requests), in which case the entering peer falls back on the streaming server for the requested content, which will decrease network savings. FIGS. 7a and b show arranging of peers in levels d=0 to d=4 starting from the streaming server SS at d=0. The dotted circles represent listed peers provided by the tracker and the smaller circles represent upload capacity u, where small black circles indicate currently occupied upload channels while small white circles indicate available upload channels.

Figure 7B:
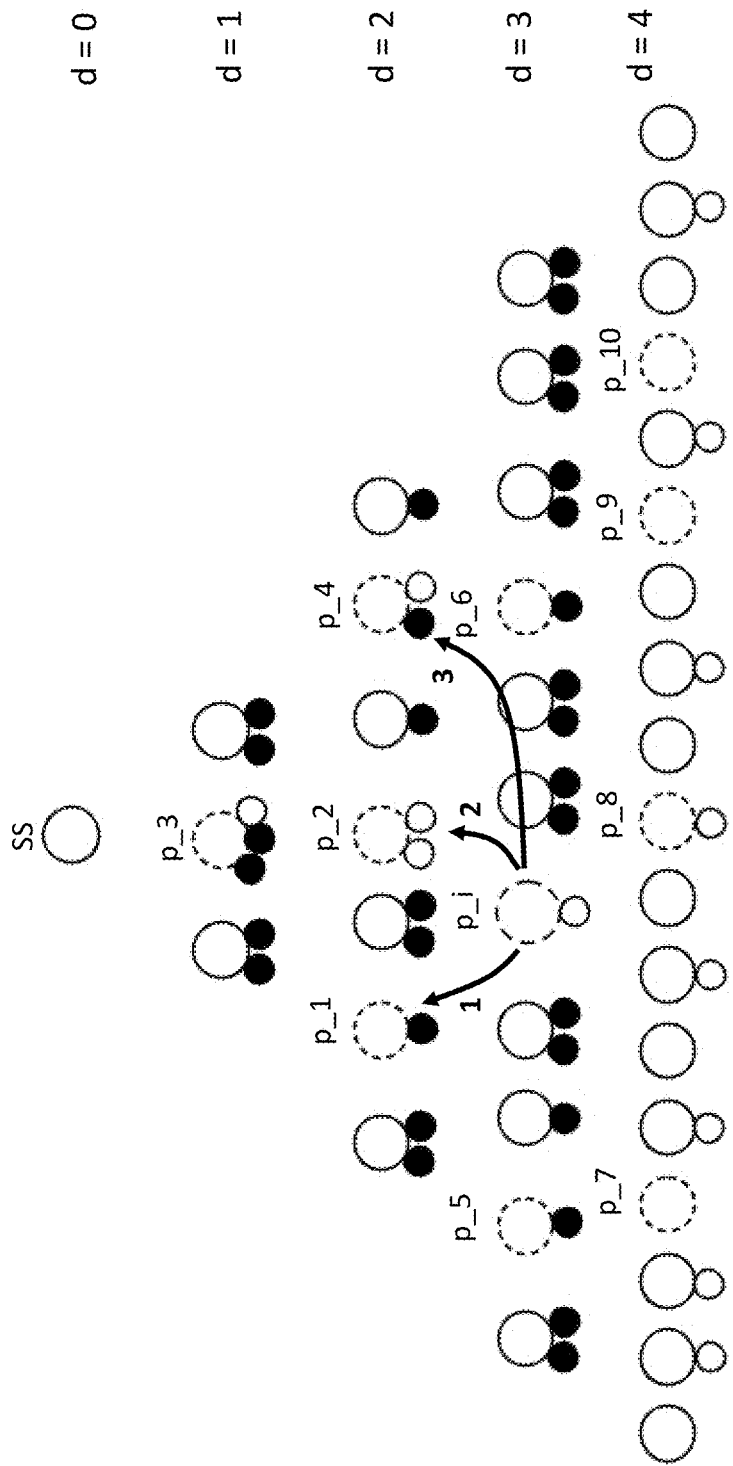
FIG. 7b illustrates an embodiment of the second aspect of the present invention where multiple requests are randomly submitted to listed network peers.

In FIG. 7a as well as in FIG. 7b, it is assumed that three equally-sized stripes are downloaded (which is not necessarily always the case; different-sized stripes could alternatively be downloaded), which three stripes are required for forming the data content requested by the requesting peer $p_i$.

As can be seen in FIG. 7a, a first download request is randomly made to neighbouring peer $p_3$ which has available upload capacity, and from which a first single stripe is downloaded. A second download request is randomly made to neighbouring peer $p_2$ which also has available upload capacity, wherein a second stripe is downloaded by the requesting peer $p_i$. Finally, a third download request is made to neighbouring peer $p_4$ and the third and final stripe is thus downloaded. The requesting peer $p_i$ can hence download the three stripes required to assemble the requested content from its neighbouring peers. It should be noted that if e.g. neighbouring peer $p_4$ would not have had available upload capacity, the requesting peer $p_i$ could have successfully turned to neighbouring peer $p_1$ for the third and final stripe.

As can be seen in FIG. 7b, a first download request is randomly made to neighbouring peer $p_1$ which has no available upload capacity, wherein a further request is made to neighbouring peer $p_2$ which has free upload capacity. In the second aspect of the present invention, the entering peer $p_1$ downloads as many stripes as possible from an approached neighbouring peer. In this example, two stripes are downloaded from peer $p_2$, thus depleting the neighbouring peer before moving to neighbouring peer $p_4$ for the remaining third stripe. A sufficient number of stripes have hence been downloaded for forming the requested data content.

By using a multiple request approach, the streaming server savings in the P2P network will advantageously increase. Further, in addition to providing a P2P network offering greater savings, the present invention has the advantage that the expected savings and/or streaming source load can be estimated a priori, which has the resulting advantage that expected streaming source capacity can be calculated in advance.

Figure 8A:
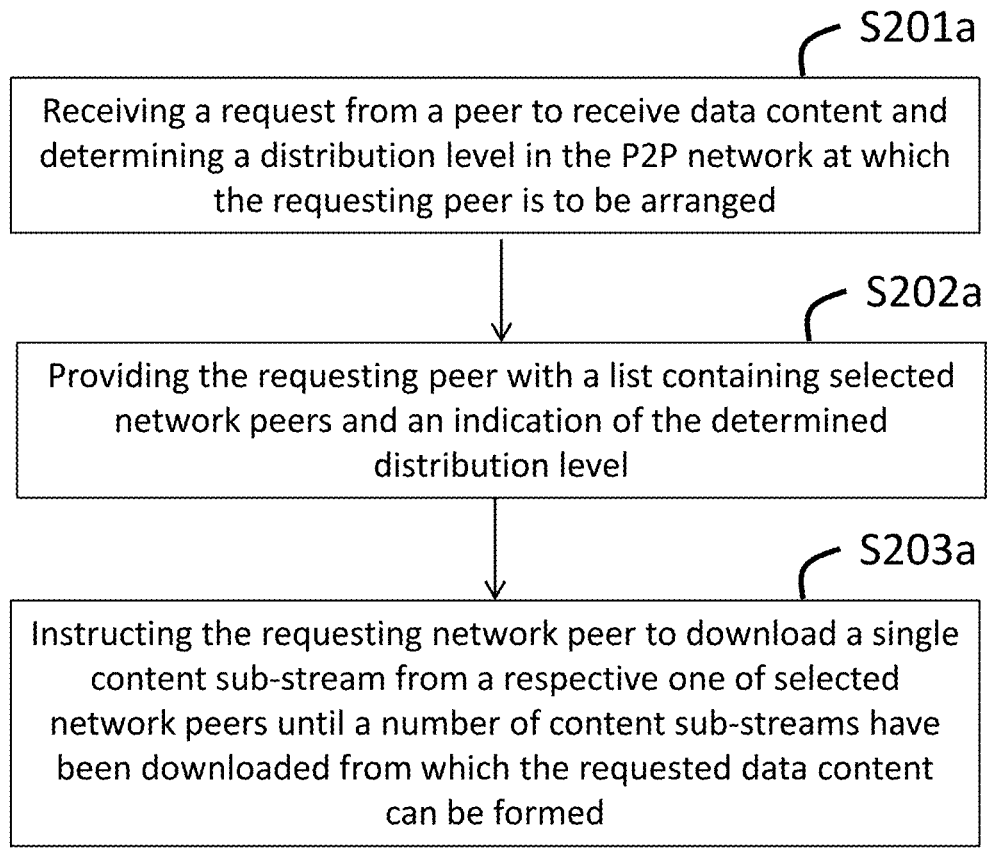
FIG. 8a shows a flowchart illustrating an embodiment of the method of arranging peers in a P2P network, i.e. seen from the perspective of the tracker, according to the first aspect of the present invention.

FIG. 8a shows a flowchart illustrating an embodiment of the method of arranging peers in a P2P network comprising a streaming source and network peers arranged at distribution levels in the P2P network, i.e. seen from the perspective of the tracker, according to the first aspect of the present invention. In a first optional step S201a, the tracker determines a distribution level in the P2P network at which the requesting peer is to be arranged with respect to the streaming source upon receipt of a download request from the requesting peer. Thereafter, the tracker optionally provides in step S202a the requesting peer with a list containing selected peers from which the requested data content can be downloaded with an expected probability depending on the determined distribution level which is indicated to the requesting peer wherein the requesting peer is enabled to download, with the expected probability, the requested data content from the selected peers. Finally, in step S203a, the requesting network peer is instructed by the tracker to download a single content sub-stream from a respective one of the selected network peers until a number of content sub-streams have been downloaded by the requesting network peer from whom the requested data content can be formed.

Figure 8B:
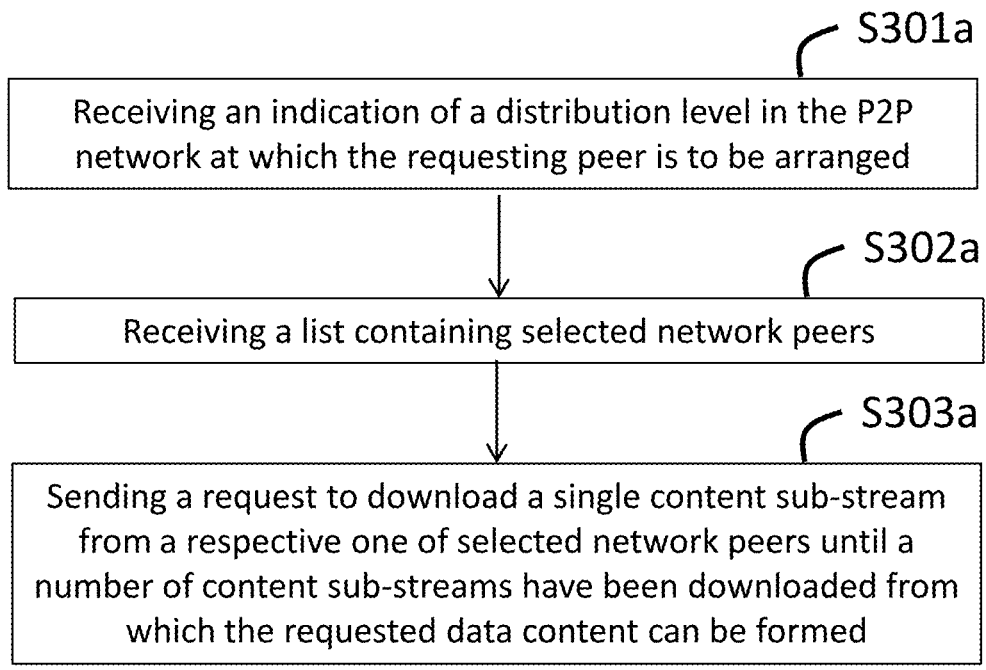
FIG. 8b shows a flowchart illustrating an embodiment of the method of requesting data content in a P2P network, i.e. seen from the perspective of a requesting peer, according to the first aspect of the present invention.

FIG. 8b shows a flowchart illustrating an embodiment of the method of requesting data content in a P2P network comprising a streaming source and network peers arranged at distribution levels in the P2P network, i.e. seen from the perspective of a requesting peer, according to the first aspect of the present invention. In a first optional step S301a, the requesting peer receives from the tracker an indication of a distribution level at which the requesting peer is to be arranged with respect to the streaming source. Thereafter, in step S302a, the requesting peer optionally receives from the tracker a list indicating a plurality of peers selected from the network peers from which the requested data content can be downloaded with an expected probability depending on the determined distribution level. In a third step S303a, the requesting peer sends a request to download a single content sub-stream from a respective one of the selected network peers until a number of content sub-streams have been downloaded by the requesting network peer from which the requested data content can be formed.

Figure 9A:
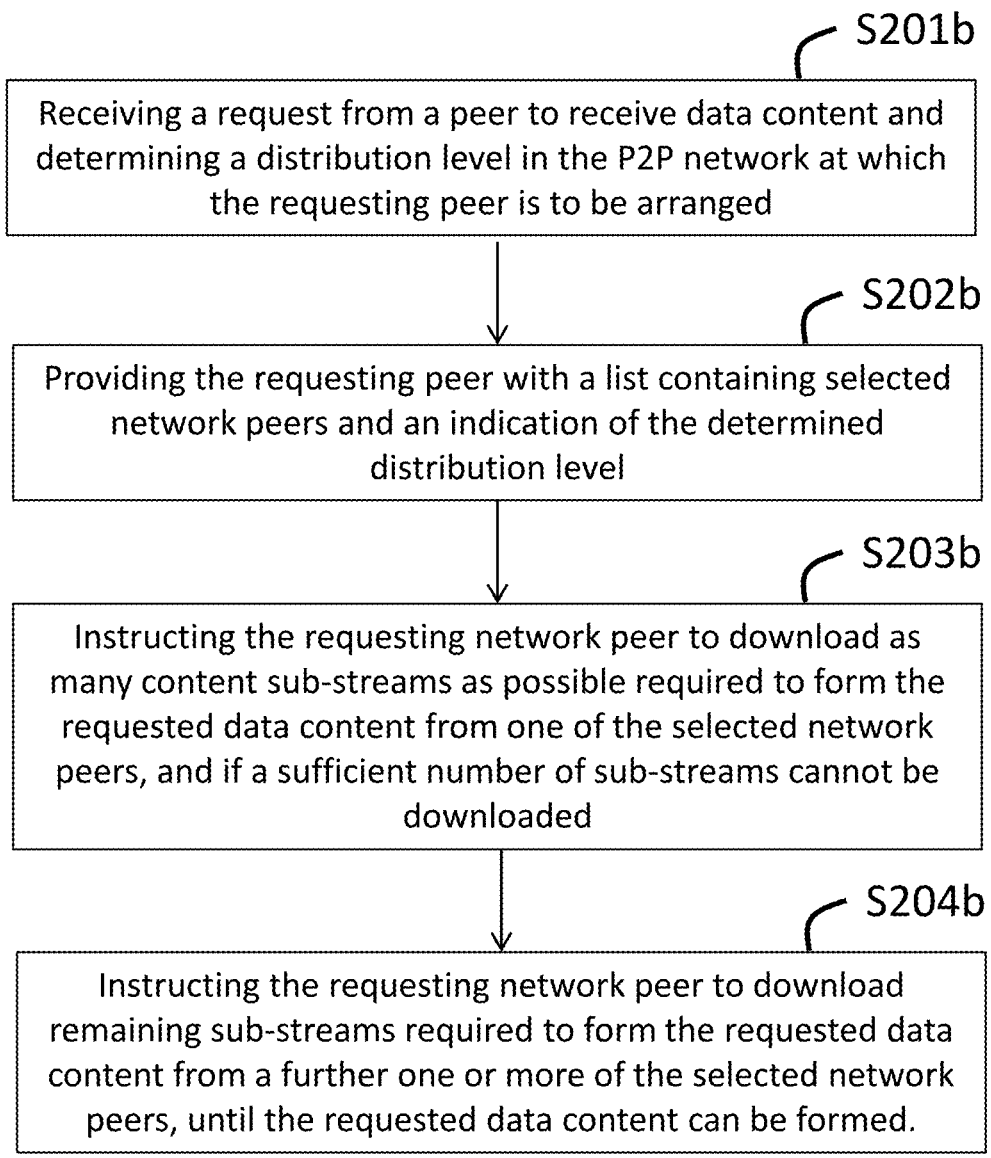
FIG. 9a shows a flowchart illustrating an embodiment of the method of arranging peers in a P2P network, i.e. seen from the perspective of the tracker, according to the second aspect of the present invention.

FIG. 9a shows a flowchart illustrating an embodiment of the method of arranging peers in a P2P network comprising a streaming source and network peers arranged at distribution levels in the P2P network, i.e. seen from the perspective of the tracker, according to the second aspect of the present invention. In a first optional step S201b, the tracker determines a distribution level in the P2P network at which the requesting peer is to be arranged with respect to the streaming source upon receipt of a download request from the requesting peer. Thereafter, the tracker optionally provides in step S202b the requesting peer with a list containing selected peers from which the requested data content can be downloaded with an expected probability depending on the determined distribution level which is indicated to the requesting peer, wherein the requesting peer is enabled to download, with the expected probability, the requested data content from the selected peers. In step S203b, the requesting peer is instructed by the tracker to download as many content sub-streams as possible required to form the requested data content from one of the selected network peers. If a sufficient number of sub-streams cannot be downloaded from the selected network peer, the tracker instructs the requesting peer in step S204b to download remaining sub-streams required to form the requested data content from one or more further network peers on the list, wherein a selected one of the one or more listed further peers is depleted of requested sub-streams before a request is made to a listed further selected one of the one or more further peers.

Figure 9B:
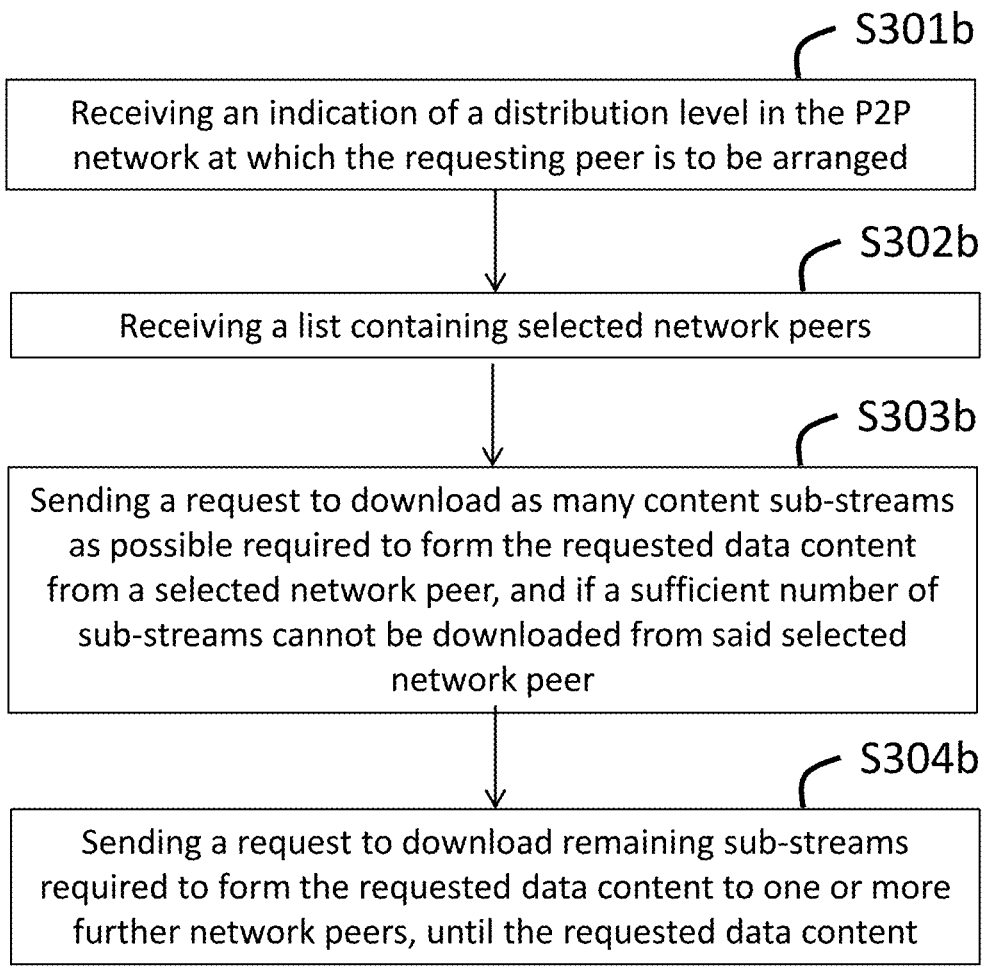
FIG. 9b shows a flowchart illustrating an embodiment of the method of requesting data content in a P2P network, i.e. seen from the perspective of a requesting peer, according to the second aspect of the present invention.

FIG. 9b shows a flowchart illustrating an embodiment of the method of requesting data content in a P2P network comprising a streaming source and network peers arranged at distribution levels in the P2P network, i.e. seen from the perspective of a requesting peer, according to the second aspect of the present invention. In a first optional step S301b, the requesting peer receives from the tracker an indication of a distribution level at which the requesting peer is to be arranged with respect to the streaming source, and in a second optional step 302b a list indicating a plurality of peers selected from the network peers from which the requested data content can be downloaded with an expected probability depending on the determined distribution level. In a third step S303b, the requesting peer sends a request to download as many content sub-streams as possible required to form the requested data content from one of the selected network peers. If a sufficient number of sub-streams cannot be downloaded from the selected network peer, the requesting peer sends in step S304b a request to download remaining sub-streams required to form the requested data content to one or more further network peers on the list, wherein a selected one of the one or more further listed peers is depleted of requested sub-streams before a request is made to a further selected one of the one or more listed further peers.

Now, as was discussed in the embodiment of the first and second aspect of the present invention described with reference to FIGS. 7a and b, the download requests may be sent randomly to the neighbouring peers provided on the list submitted by the tracker. Hence, a random selection policy can be applied. However, as will be shown in the following, more elaborate selection policies are envisaged.

In the previous examples, the tracker did not take into account a situation where a joint probability of distribution level and upload capacity $p(u, d)$ exists. If the distribution level and upload capacity is modelled as joint probability variables, it is possible to attain even better results in determining distribution level of an entering peer. The probability distribution of distribution level $d_i$ with respect to the streaming source is the sum over u of the joint probability $p(u, d_i)$ as follows:

$$p(d_i) = \sum_u p(u, d_i)$$

Thus, with respect to the embodiments of the first and second aspects of the present invention shown with reference to FIGS. 7a and b, the joint probability is in a further embodiment considered when determining on which distribution level the entering/requesting peer is to be arranged.

In a further embodiment of the present invention, load allocation among peers in the network could be better balanced by having the tracker not only take into account the level and upload capacity u of the peers, i.e. not only the joint probability $p(u, d_j)$ of the level and upload capacity is considered, but also by giving priority to peers having a higher upload capacity. Thus, of the k neighbouring peers on the list provided by the tracker, the entering peer will send a request to the neighbouring peer having the highest upload capacity u. If two or more neighbouring peers have the same upload capacity, any one of the two or more peers could be selected for receiving the request. If the entering peer at level $d_i$ had one or more neighbouring peers in region $\alpha_i$ and furthermore was indifferent with respect to the subset of neighbouring peers located in said region, i.e. in case a random and unbiased selection would be made for the request sent from the entering peer, the probability that its download request actually will go to a peer at level $d_j$ and upload capacity u is $p(u, d_j)/P\alpha_i$. However, in this further embodiment, the joint probability $p(u, d_j)$ of the level and upload capacity is weighted with upload capacity, resulting in $u \times p(u, d_j)$ wherein the probability that a request for content data is made to a peer having a higher upload capacity will increase.

Figure 10:
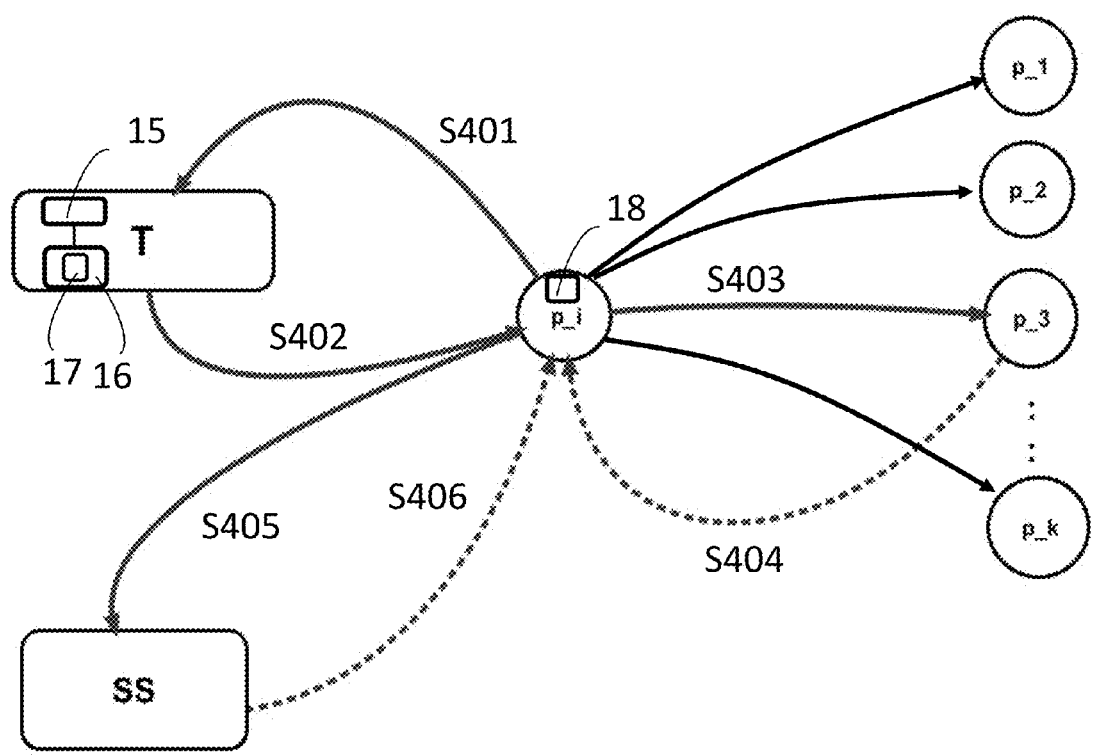
FIG. 10 illustrates an embodiment of the present invention showing multiple requests for requested data content.

FIG. 10 shows a P2P network in which embodiments of the present invention are implemented. Continuous lines denote request/reply messages, while dashed lines denote streaming channels. A new peer $p_i$ enters the network and requests the tracker T in step S401 via its communication interface to receive data content originally streamed from the streaming source SS. The tracker determines the level at which the entering peer $p_i$ is to be arranged. By controlling the level, the expected probability of a successful download can be varied accordingly; the more downstream the level, the higher the chances of successful download. However, this will on the other hand imply further delay from the real-time playback point RT.

This is for example performed by having the tracker T sample a conditional probability distribution of level and upload capacity p(d|u) for the network peers. Hence, the tracker T gives each joining peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution p(u, d) is the desired distribution that the P2P network will eventually settle to. To enable this, in an embodiment, each entering peer provides its upload capacity to the tracker with the request as submitted in step S401. This embodiment could advantageously be combined with those discussed in connection to FIGS. 8-9.

In step S402, the tracker T provides the entering peer $p_i$ with a list of a plurality k of peers from which the data content can be downloaded, and indicates to the entering peer $p_i$ the determined distribution level at which it is to be arranged. Further, the list indicates upload capacity u of each among the k peers in order to have the entering peer subsequently give priority to a first peer having higher upload capacity u than a second peer among the plurality of selected peers, when the entering peer $p_i$ is to determine a peer on the list from which to download the requested data content.

The upload capacity could be indicated either as an actual upload measure, but could alternatively be indicated by a prioritization number, where for instance 10 is the highest priority and 1 is the lowest priority. Each peer may thus be reporting to the tracker T its respective upload capacity when the peer enters the network.

Further, as to the tracker T selecting a plurality k of peers, this can be undertaken in a number of different ways. In a first alternative, the plurality of peers is randomly selected from the larger group of network peers, thus making it easy for the tracker T to make the selection. In a second alternative, the tracker T first selects a group of peers and then filters out a plurality k of peers at a level lower than that of the entering peer $p_i$. To the contrary, this filtering could alternatively be undertaken by the entering peer $p_i$ itself once the list of k randomly selected peer is received. In a third alternative, the tracker T provides the entering peer with a list which is more biased towards peers who have joined the network recently while incorporating their upload capacity, which peers are more likely to have available upload bandwidth since recently joining peers are less likely to yet have been fully loaded. Even further alternatives can be envisaged, such as e.g. whether peers are network address translation (NAT) compatible or not. In the following, it will be assumed that k peers are randomly selected by the tracker T.

The list provided by the tracker T to the entering peer $p_i$ in step S402 could have the appearance set out in Table 1.

TABLE 1

| Peer no. | Upload capacity (u) | Level (d) |
|---|---|---|
| $p_i$ | 1 | 3 |
| $p_1$ | 1 | 2 |
| $p_2$ | 2 | 2 |
| $p_3$ | 3 | 1 |
| $p_4$ | 2 | 2 |
| $p_5$ | 1 | 3 |
| $p_6$ | 1 | 3 |
| $p_7$ | 0 | 4 |
| $p_8$ | 1 | 4 |
| $p_9$ | 0 | 4 |
| $p_{10}$ | 0 | 4 |

Reference is further made to FIG. 10 showing arranging of peers in levels according to Table 1 starting from the streaming server SS at d=0. Again, the dotted circles represent listed peers provided by the tracker and the smaller circles represent upload capacity u, where small black circles indicate currently occupied upload channels while small white circles indicate available upload channels.

Figure 11:
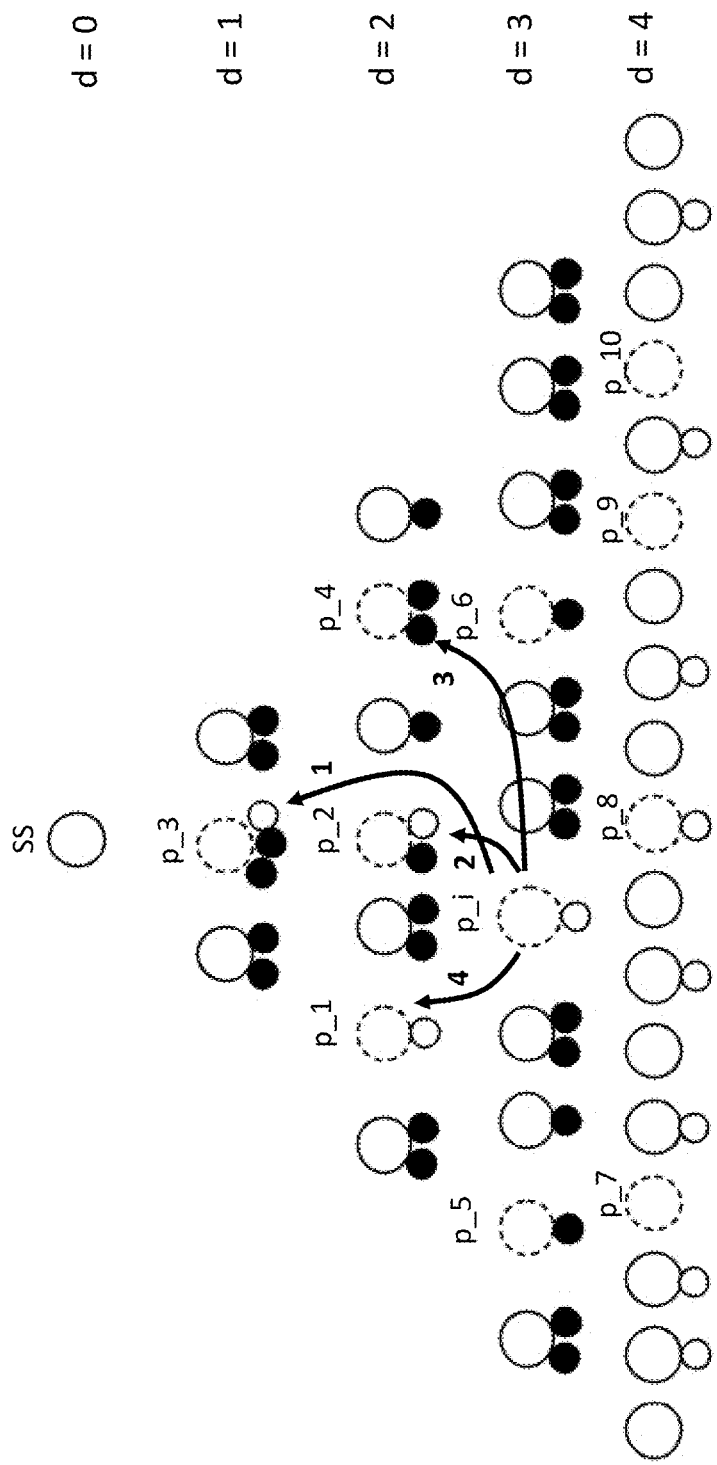
FIG. 11 illustrates a data request selection policy according to an embodiment of the present invention.

With reference to FIG. 10, the entering peer requests in step S403 a selected peer on the list, i.e. a selected one of peers $p_1$, $p_2$, $p_3$, . . . , $p_k$, to supply it with a requested piece of data content. If there exists at least one peer out the k selected peers at a level with respect to the streaming source that is lower than that determined for the entering peer, it is possible that the requested data content can be uploaded to the entering peer $p_i$. As can be seen in Table 1 and corresponding FIG. 11, in this particular embodiment, peer $p_3$ is selected by the entering peer $p_i$ since it has the highest upload capacity of the peers selected by the tracker T and is thus given priority among the plurality of peers selected by the tracker T. In this particular exemplifying embodiment, the peer $p_3$ is at a level lower than that of the entering peer $p_i$ and further has available upload capacity. It is assumed that three stripes are required to be downloaded for forming the data content requested by the requesting peer $p_i$. Thus, in the first aspect of the present invention, the neighbouring peer $p_3$ uploads S404 the requested stripe to $p_i$. The entering peer $p_i$ submits S403 a further download request to another listed peer. In this particular exemplifying embodiment, two of the remaining neighbouring peers $p_2$ and $p_4$ have the highest upload capacity (and are placed on a level lower than that of entering peer $p_i$). As can be seen in FIG. 11, the second download request is made to the neighbouring peer $p_2$ which as free capacity. The neighbouring peer $p_3$ subsequently uploads, in step S404, a further stripe to the entering peer $p_i$. A third download request is made to the neighbouring peer $p_4$, which has the next highest upload capacity of u=2. However, a request from the entering peer $p_i$ to the neighbouring peer $p_4$ to download a desired piece of content will still not be successful since the peer $p_3$ has no free capacity. Consequently, the entering peer $p_i$ turns to the neighbouring peer $p_1$ having the next highest upload capacity, which also turns out to have free upload capacity. The third and final stripe can thus be uploaded to the requesting peer $p_i$, and the requested data content can be successfully formed.

Again with reference to FIG. 10, if no peer among the listed peers should be positioned at a level with respect to the streaming source that is lower than that determined for the entering peer, or if no upload capacity can be provided, or if a maximum number of request attempts has been reached, the requested data content cannot be uploaded in step S404 to the entering peer. In that case, the entering peer $p_i$ would in step S405 turn to the streaming server SS for the requested data content, which in its turn would upload the requested data content to the entering peer in step S406.

With reference to FIG. 11, in an embodiment of the second aspect of the present invention where upload capacity is prioritized, the entering peer $p_i$ submits a download request to neighbouring peer $p_3$ having the highest upload capacity of the peers selected by the tracker and is thus given priority among the plurality of peers selected by the tracker. The entering peer $p_i$ requests as many stripes as possible from peer $p_3$ and thereafter submits a request to any one of peers $p_2$ or $p_4$ for further stripes if required.

As previously mentioned, a request from a requesting peer to a neighbouring peer located downstream from, or at the same level as, the requesting peer will not be successful since the downstream neighbouring peer for reasons of latency does not have access to the content data requested by the requesting peer. As can be seen in Table 1, this applies to neighbouring peers $p_5$-$p_{10}$. To avoid this scenario, another embodiment of the present invention will be described where the tracker will undertake a more elaborate selection process when creating the list of k selected peers to be provided to the entering peer $p_i$. Reference is made to Table 2 showing a further exemplifying list of peers provided by the tracker T to the requesting peer $p_i$, in step S402 of FIG. 10.

TABLE 2

| Peer no. | Upload capacity (u) | Level (d) |
| --- | --- | --- |
| $p_i$ | 1 | 3 |
| $p_1$ | 1 | 2 |
| $p_2$ | 2 | 2 |
| $p_3$ | 3 | 1 |
| $p_4$ | 2 | 2 |

As can be seen in Table 2, the tracker, or alternatively the requesting peer itself, has filtered out all peers at a level equal to or greater than that of the entering peer, which raises the requirements on the tracker (or the requesting peer), but will increase the probability that the requesting peer successfully will download requested data from one of its neighbouring peers. It should be noted that in case the tracker filters out all peers at a level equal to or greater than that of the requesting peer, it could add further peers to the list such that it contains the same number of peers as before the filtering.

In analogy with that discussed above, with reference to FIG. 10, depending on how the level $d_i$ for the entering peer $p_i$ is selected, the probability that the streaming server SS will have to upload the requested data content to the entering peer in step S406 can be increased or decreased. These probabilities will be discussed in detail in the following. The savings in the streaming server SS bandwidth is directly related to the probability that a network peer can upload requested data content to the entering peer $p_i$.

If the selection policy regarding peers having a highest upload capacity according to embodiments of the present invention is applied, it can be assumed that each peer is more likely to request data content from a neighbouring peer with a higher bandwidth/upload capacity u, the selection policy still requiring that the neighbouring peer is arranged at a level lower than that of the requesting peer. For a level $d_j$ the number of expected download requests from peers at level $d_i$ would then be:

$$R_{iju} = \begin{cases} N_{p_i} \ Y^b_{iju} & \text{if } j \le i - \delta \\ 0 & \text{otherwise,} \end{cases}$$

where $$Y^b_{iju} = \frac{p(d_j)}{p_{\alpha_i}} \frac{up(u, d_j)}{\sum_u up(u, d_j)}$$

The selection policy employed in this embodiment will guarantee that no request for data content is made to a neighbouring peer having u=0 (being for instance a mobile phone). It can be seen that this selection policy takes into account the bandwidth that is available at a given level $d_j$ for a peer having a certain potential bandwidth u, i.e. by advantageously forming the term u p(u, $d_j$). Thus, in addition to allocating load on peers based on the joint probability of level and upload capacity, p(u, $d_j$), this embodiment enhances the selection policy by requesting data content with higher probability from peers having higher upload capacity, which will facilitate load balancing as peers with higher upload capacity will receive more requests than peers with low upload capacity and hence this will increase the savings, since the probability of having peers falling back on the streaming server for requested data content decreases.

Figure 12:
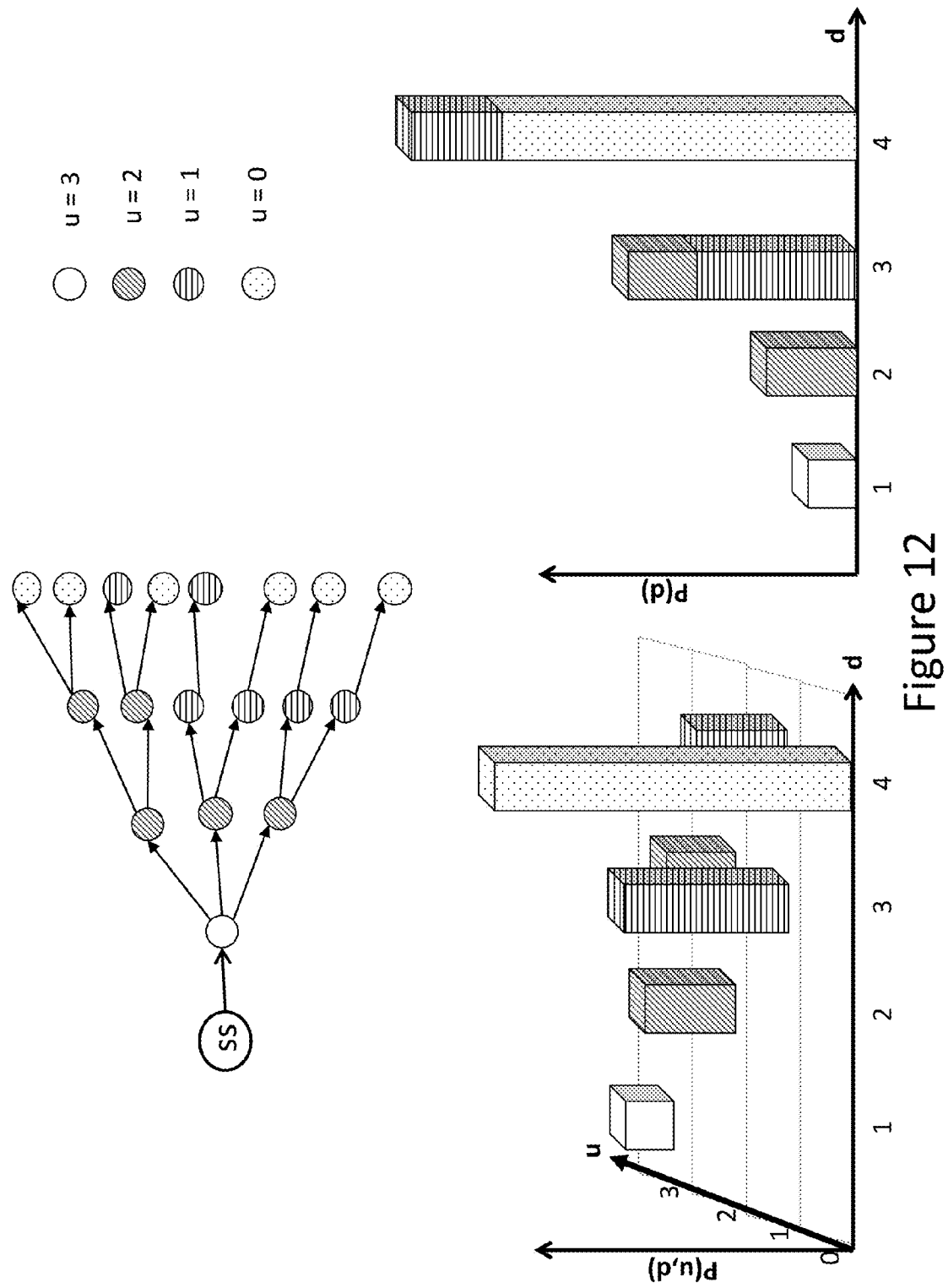
FIG. 12 illustrates joint probability of distribution level and upload capacity.

FIG. 12 illustrates joint probability of distribution level and upload capacity p(u, d). The upper left part of FIG. 12 shows a P2P network where peers are arranged at a first, second, third and fourth level with respect to a streaming source.

Further, the peers in the network have an upload capacity from u=0 to u=3. The lower left part of FIG. 12 illustrates the joint probability p(u,d) on the z axis, while the y axis represents the upload capacity and the x axis represents the distribution level of the peers in the P2P network. The lower right part of FIG. 12 shows a discrete version of a p(d) distribution (previously illustrated in FIG. 4) derived from the p(u, d) distribution shown in the lower left part. That is, the p(d) distribution is formed by aggregating probability masses at each distribution level. Analogously, a p(u) distribution could be formed by aggregating the probability masses at each upload capacity measure.

The total number of download requests that neighbouring peers make to peers at level $d_j$ and upload capacity u is:

$$R_{ju} = \sum_{i=j+1}^{\infty} R_{iju}$$

In order to find how many of these requests will be satisfied given that the number of peers at level $d_j$ and upload capacity u is expressed as $N_{ju}$, the probability that a peer at level $d_j$ and upload capacity u will respond to l requests for download from the total number $R_{ju}$ of download requests as:

$$B_{ju}(l) = \binom{R_{ju}}{l}\left(\frac{1}{N_{ju}}\right)^l\left(1 - \frac{1}{N_{ju}}\right)^{R_{ju}-l}$$

where $N_{ju}=p(u, j)N$ is the expected number of peers at level $d_j$ and upload capacity u. Therefore, the expected number of successful responses that peers at level $d_j$ and upload capacity u make to download requests from neighbouring peers (i.e. the load on peers at level $d_j$ and upload capacity u) is:

$$L_{ju} = \left(\sum_{l=1}^{u} lB_{ju}(l) + u\left(1 - \sum_{l=0}^{u} B_{ju}(l)\right)\right)N_{ju}$$

and hence the expected number of peers streaming from the P2P network is the total number of successful downloads:

$$L = \sum_{j=0}^{\infty}\sum_{u} L_{ju}$$

and the savings will be expressed as in Equations (8) or (7).

With reference to Equation (6), $P_s(d_i)$ can be calculated, i.e. the probability that a peer with at a level $d_i$ makes a successful download from the P2P network when peer upload capacity represented by u p(u, $d_j$) is taken into account, where u' is for summation in the numerator and represents a summation over all possible values of upload capacity.

$$P_s(d_i) = (1 - P_F(d_i))\sum_{u}\frac{\sum_{j=0}^{j=i-1} L_{ju}p(d_j)}{R_{ju}P_i}\frac{up(u, d_j)}{\sum_{u'} u'p(u', d_j)} \quad (9)$$

Thus, again with reference to FIG. 10, in this embodiment of the present invention, the probability of having a selected peer, to which a download request is sent, out of the k listed randomly selected peers successfully upload requested data content in step S404 to the entering $p_i$ is given by $P_s(d_i)$ expressed by Equation (9).

As can be seen, in addition to previously discussed advantages of the present invention, the expected savings and/or streaming source load can be estimated a priori, which has the resulting advantage that expected streaming source capacity can be calculated in advance.

In yet a further embodiment, should two or more neighbouring peers have the same upload capacity u, but be arranged at different levels d (lower than that of the requesting peer), the requesting peer will send the request to the one of the two or more neighbouring peers being nearest positioned in the P2P network, i.e. the one of the two or more peers at a level closest to that of the requesting peer. This is advantageous, since in P2P networks, there is a risk that peers at a level close to the streaming source will be assigned a greater load than those peers which are located further downstream, even if the distribution over distribution levels is assumed to be uniform. This is because peers at a level $d_i$ potentially will be a target for content requests from all peers at levels $d_i+\delta$, $d_i+2\delta$, $d_i+3\delta$, and so on. Hence, if streaming server savings are to be improved, there is a trade-off between increasing density among peers being located at a level closes to the streaming source to handle the load from peers being located at levels further away from the source, and increasing the probability that peers will download directly from the streaming server since the density of peers closes to the streaming server is increased. Therefore, it may be desirable to construct the P2P network such that a selection policy is applied where peers will prioritize their nearest upstream neighbouring peers, in which case a significant load balancing among the peers in the network can be achieved. Thus, in this particular embodiment, the requesting peer $p_i$, will send a download request to any one of the neighbouring peers $p_2$ or $p_4$ rather than to the neighbouring peer $p_3$; if a multiplicity of peers has the same bandwidth, the nearest peer is selected for receiving a download request. The probability distribution of bandwidth in the α region is calculated as:

$$p_{\alpha_i}(u) = \sum_{j \in \alpha_i} p(u, j)$$

Given that a peer falls in the α region, the probability that it will have a bandwidth u will hence be:

$$p_i(u) = \frac{p_{\alpha_i}(u)}{p_{\alpha_i}}$$

The probability that c peers in the α region having the same upload capacity u are selected for receiving a download request in this particular embodiment can be calculated as:

$$\tilde{p}_{iju}^c = \left(1 - \left(1 - \frac{p(u, d_j)}{p_{\alpha_{j+1}}(u)}\right)^c\right)\prod_{w=j+\delta}^{i-\delta}\left(1 - \frac{p(u, d_w)}{p_{\alpha_{w+1}}(u)}\right)^c$$

It follows that the probability of selecting a peer by giving preference to those with greater upload capacity and selecting the one that is nearest in the case of having a number of peers with the same upload capacity is:

$$\check{p}_{iju} = \sum_{c=1}^{k} \binom{k}{c} (p_{\alpha_i}(u))^c (1 - p_{\alpha_i}(u))^{k-c} \check{p}_{iju}^c$$

For a level $d_j$, the number of expected download requests from peers at level $d_j$ given this slight modification would be:

$$R_{iju} = \begin{cases} N_i \check{p}_{iju} & \text{if } j \leq i - \delta \\ 0 & \text{otherwise} \end{cases}$$

Thus, with this embodiment, it is possible to avoid putting a higher load on peers positioned at a level close to the streaming source than those peers which are located further downstream. The probability of successful download, $P_s(d_i)$, can be calculated accordingly in line with Equation (9).

As has been previously described, there is a risk in P2P networks that peers being arranged at a low distribution level with respect to the streaming source, i.e. peers being located close to the streaming source, will be assigned a greater load than those peers which are further away from the streaming source, i.e. peers arranged at a higher level, even if the distribution over levels is assumed to be uniform. That is because peers at level $d_i$ potentially will be a target for content requests from all peers at levels $d_i+\delta$, $d_i+2\delta$, $d_i+3\delta$, and so on. Hence, if streaming server savings are to be improved, there is a trade-off between increasing density among peers having low latency with respect to the real-time playback point, i.e. peers arranged at a level closer to the source, to handle the load from peers having higher latency, and increasing the probability that peers will download directly from the streaming server since the density of peers closes to the streaming server is increased. Therefore, it may be desirable to construct the P2P network such that a selection policy is applied where peers will prioritize their nearest neighbouring peers, in which case a significant load balancing among the peers in the network can be achieved. Hence, in an embodiment of the present invention, a requesting peer is instructed to prioritize its nearest neighbouring peer(s) at an upstream level.

Figure 13:
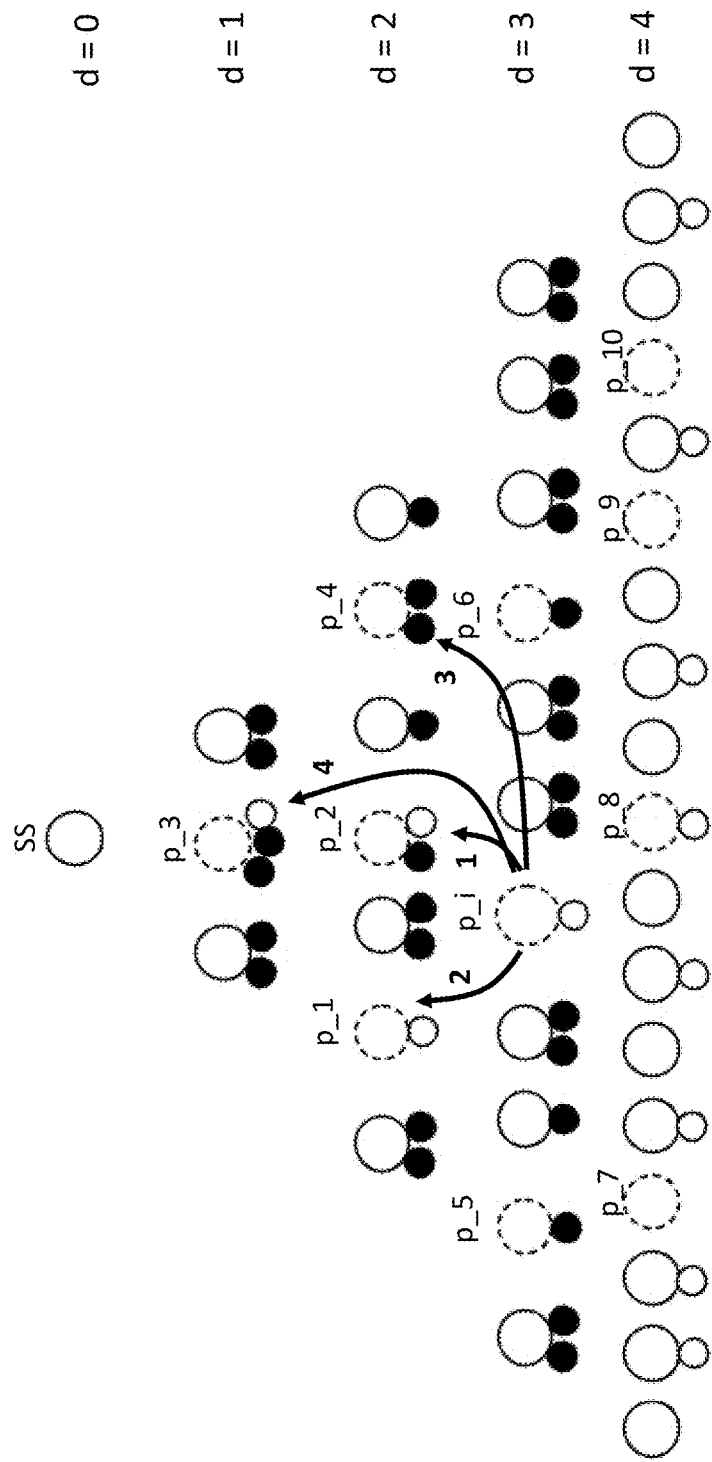
FIG. 13 illustrates a data request selection policy according to a further embodiment of the present invention.

Reference is made to FIG. 13 (and earlier FIG. 10), where it can be seen that the list provided by the tracker T to the requesting peer $p_i$, in step S402 has the appearance as that previously set out in Table 1 and corresponding FIG. 11.

In this particular embodiment, a nearest peer selection policy is applied; when sending the download request, the peers are not given priority in order of upload capacity, but in order to closeness in the distribution levels. However, a further embodiment combining a nearest peer selection policy and a highest bandwidth selection policy will be described subsequently.

Thus, again with reference to FIGS. 10 and 13, in the first aspect of the present invention, the requesting peer $p_i$ requests in step S403 a selected peer on the list, i.e. a selected one of neighbouring peers $p_1, p_2, p_3, \ldots, p_k$, to supply it with a desired piece of content. As can be seen in FIG. 13, neighbouring peer $p_2$ is selected by the requesting peer $p_i$ since it is located at the nearest level of the peers selected by the tracker and is thus given priority among the selected peers (along with the neighbouring peers $p_1$ and $p_4$ which has the same order of priority by virtue of being arranged at the closest upstream level). A download request submitted from the requesting peer $p_i$ to the neighbouring peer $p_2$ to download a first stripe is thus successful (given that the peer $p_2$ has available upload capacity, which in this case it has). The neighbouring peer $p_2$ subsequently uploads, in step S404, the requested data content to the requesting peer $p_i$. Again, it is assumed that three stripes are required to be downloaded for forming the data content requested by the requesting peer $p_i$. Thereafter, a request is submitted to neighbouring peer $p_1$, which successfully uploads the second stripe to the requesting peer $p_i$. This is followed by a request submitted to neighbouring peer $p_4$, which has the same order of priority as $p_1$ and $p_2$. However, peer $p_4$ does not have available upload capacity, implying that the download request cannot be met. The next-nearest upstream neighbouring peer is $p_3$, which further has available upload capacity, and the third and final stripe is uploaded to the requesting peer $p_i$. The requested data content can thus be formed by assembling the three downloaded stripes appropriately.

With reference to FIG. 13, in an embodiment of the second aspect of the present invention where peer position is prioritized, the requesting peer $p_i$ submits a download request to any one of neighbouring peers $p_1$, $p_2$, and $p_4$ being arranged closest upstream from the requesting peer $p_i$ as indicated by the tracker. In this example, the entering peer $p_i$ requests as many stripes as possible from peer $p_2$, thereby depleting $p_2$, and thereafter submits a request to any one of peers $p_1$ or $p_4$ for further stripes if required. Should the neighbouring peers $p_1$ or $p_4$ not have free upload capacity, the requesting peer $p_i$ would turn to the next-order peer $p_3$ and ultimately to the streaming source SS.

Hence, the requesting peer requests data from its nearest peer on the list. This scenario is modeled by applying a download request approach where a peer with latency $d_i$ requests data from a peer having latency $d_j$. Thus, a different probability distribution for peer requests is assumed with respect to the previously described download request approach where an entering peer randomly selects a neighbouring peer from the list provided by tracker, or selects a neighbouring peer from the list based on upload capacity.

When applying the nearest-peer-selection policy according to embodiments of the present invention, it is first assumed that for any peer at level $d_i$, the number of neighbours in region $\alpha_i$ out of the k neighbours is c. The probability that no peer out of the c neighbours will be arranged at level $i-\delta$ is:

$$p_f^c(d_{i-\delta}) = \left(1 - \frac{p(d_{i-\delta})}{p_{\alpha_i}}\right)^c.$$

Furthermore, the probability that no peer out of the c neighbouring peers will be arranged at level $i-2\delta$ (given that there were no neighbouring peers at level $i-\delta$) is:

$$p_f^c(d_{i-2\delta}) = \left(1 - \frac{p(d_{i-2\delta})}{p_{\alpha_{i-\delta}}}\right)^c.$$

In general $p_f^c(d_{i-\omega\delta})$ is the probability of having none of c neighbouring peers in region $\alpha_i$ at level $i-\omega\delta$ (given that none of the neighbouring peers were located at level $i-\delta$, $i-2\delta$, ..., $i-\omega\delta$).

Further, the probability of having no neighbouring peer in the interval $[j+\delta, i-\delta]$ is:

$$p_{f_{i,j}}^c = \prod_{w=j+\delta}^{i-\delta} p_f^c(d_w),$$

where $j \leq i-\delta$ and $(1-p_f^c(j))$ is the probability that at least one of the c neighbouring peers is arranged at level j and all c neighbours also fall in region $\alpha_{j+1}$. As it has been assumed that all c neighbouring peers fall in region $\alpha_i$, the probability of having all c neighbouring peers fall in region $\alpha_{j+1}$ is simply $p_{f_{i,j}}^c$. Then, for peers having latency $d_i$, the probability of having at least one neighbouring peer arranged at level $d_j$ given that all c neighbouring peers fall in $\alpha_{j+1}$ is:

$$\rho_{ij}^c = \left(1 - \left(1 - \frac{p(d_j)}{p_{\alpha_{j+1}}}\right)^c\right) \prod_{w=j+\delta}^{i-\delta} \left(1 - \frac{p(d_w)}{p_{\alpha_{w+1}}}\right)^c$$

$$= (1 - p_f^c(d_j)) p_{f_{i,j}}^c$$

Next, this probability is calculated for all values of c, i.e. for c=1, ..., k as follows:

$$\rho_{ij} = \sum_{c=1}^{k} \binom{k}{c} (p_{\alpha_i})^c (1-p_{\alpha_i})^{k-c} \rho_{ij}^c,$$

which in this particular embodiment is the distribution of the $N_{p_i}$ requests in region $\alpha_i$.

As previously has been discussed, in a more elaborate selection policy, the tracker not only takes into account distribution level but also upload capacity u of the plurality of selected peers.

The number of download requests, $R_{iju}$, from peers with latency $d_i$ to peers with latency $d_j$ and upload capacity u, is:

$$R_{iju} = \begin{cases} N_i \rho_{iju} & \text{if } j \leq i - \delta \\ 0 & \text{otherwise,} \end{cases} \quad (10)$$

where $$\rho_{iju} = \rho_{ij} \frac{p(u, d_j)}{p(d_j)}$$

Now, with respect to the embodiment of the invention concluded in Equation (10), i.e. the selection policy where the nearest peer is selected for receiving a download request when considering the joint probability $p(u, d_i)$, $P_s(d_i)$ can be calculated, i.e. the probability that a peer at a level $d_i$ makes a successful download from the P2P network when selecting a nearest peer, with reference to Equation (6):

$$P_s(d_i) = (1 - P_F(d_i)) \sum_u \frac{\sum_{j=0}^{j=i-1} L_{ju}}{R_{ju}} \rho_{ij} \frac{p(u, d_j)}{p(d_j)} \quad (11)$$

Thus, again with reference to FIG. 8, in this embodiment of the present invention, the probability of having a selected peer out of the k listed peers successfully upload requested data content in step S404 to the entering $p_i$ is given by $P_s(d_i)$ expressed by Equation (11).

As can be seen, in addition to previously discussed advantages of the present invention, the expected savings and/or streaming source load can be estimated a priori, which has the resulting advantage that expected streaming source capacity can be calculated in advance.

As previously has been discussed, in an embodiment of the present invention, the tracker T of FIG. 10 samples a conditional probability distribution of level and upload capacity p(d|u) for the network peers. Hence, the tracker T gives each entering peer its position in the network in terms of distribution level d from the streaming source SS based on its upload capacity u according to the conditional distribution p(d|u)=p(u, d)/p(u), i.e. the probability that an entering peer will be arranged at a level d given that it has an upload capacity of u. This is further advantageous in that peers having higher upload capacity can be arranged at a lower level, i.e. be placed closer to the streaming source SS. Thus, the joint distribution p(u, d) is the desired distribution that the P2P network will eventually settle to. To enable this, in an embodiment, each entering peer provides its upload capacity to the tracker T with the request as submitted in step S401.

As a consequence, in addition to taking into account nearest neighbouring peers their respective upload capacity is also considered in an embodiment and further given priority when the entering peer $p_i$ determines to which listed peer a download request should be submitted. It is here assumed that the probability distribution of requests from peers having latency $d_i$ to neighbouring peers having latency $d_j$ and bandwidth u is proportional to the density of $u \times p(u, d)$, i.e. the density of the joint probability p(u, d) of the latency and bandwidth weighted with the bandwidth u. The following modification is undertaken accordingly:

$$R_{iju} = \begin{cases} N_i \hat{\rho}_{iju} & \text{if } j \leq i - \delta \\ 0 & \text{otherwise,} \end{cases} \quad (12)$$

where $$\hat{\rho}_{iju} = \rho_{ij} \frac{up(u, d_j)}{\sum_u up(u, d_j)}.$$

This selection policy tends to behave as if there is a central coordination, since the tracker will have a peer prefer to request data content from the nearest possible neighbouring peer, which is similar to the concept of centrally managed systems where each level utilize the required bandwidth from the preceding level. Also, this policy handles load balancing among peers in that a request is made to a given peer relative to its upload bandwidth u.

To illustrate a further embodiment of the present invention, where peers are further given priority by also considering their upload capacity, reference is made again to FIG. 13. As can be seen in FIG. 13, neighbouring peers $p_1$, $p_2$ and $p_4$ are located at the second level, i.e. the level nearest the third level at which the entering peer $p_i$ is arranged. Thus, in a previously described embodiment, where the upload capacity of the neighbouring peers were not taken into account when the entering peer $p_i$ was to select a peer for submission of a download request, any one of the neighbouring peers $p_1$, $p_2$, and $p_4$ could have been subject to the download request. However, in this particular embodiment of the first aspect of the invention, neighbouring peer $p_1$ has u=1 while neighbouring peers $p_2$ and $p_4$ have u=2, meaning that the entering peer $p_i$ will select either peer $p_2$ or $p_4$ as recipient of the download request for the first stripe. As can be seen, the request is successfully made to peer $p_2$ having available capacity. Thereafter, the entering peer $p_i$ submits a download request to neighbouring peer $p_4$, since it has a greater upload capacity than the neighbouring peer $p_1$ remaining at the same level, which successfully uploads the second stripe. Finally, a third request is sent to neighbouring peer $p_1$ which uploads the third stripe to the entering peer $p_i$.

In a corresponding embodiment of the second aspect of the present invention, the order of request would be the same, with the difference that a neighbouring peer is depleted of stripes before the entering peer moves on to the next neighbouring peer (if required).

In analogy with that discussed above, depending on how the level $d_i$ for the entering peer $p_i$ is selected, the probability that the streaming server will have to upload the requested data content to the entering peer can be increased or decreased. These probabilities have been discussed in detail hereinabove and will be discussed in further detail in the following. The savings in the streaming server bandwidth is directly related to the probability that a network peer can upload requested data content to the entering peer.

If the selection policy according to embodiments of the present invention is applied, where priority further is given to peers having the highest upload capacity of two or more peers located at the nearest level, it can be assumed that each peer is more likely to request data content from a neighbouring peer with a higher bandwidth/upload capacity u. For a level $d_j$, the number of expected download requests from peers at level $d_i$ was calculated in Equation (12).

The selection policy employed in this embodiment will guarantee that no request for data content is made to a neighbouring peer having u=0 (being for instance a mobile phone). It can be seen that this selection policy takes into account the bandwidth that is available at a given level $d_j$ for a peer having a certain potential bandwidth u, i.e. by advantageously forming the term u $p(u, d_j)$ Thus, in addition to allocating load on peers based on the joint probability of level and upload capacity, $p(u, d_j)$, this embodiment enhance the selection policy by requesting data content with higher probability from peers having higher upload capacity, which will facilitate load balancing as peers with higher upload capacity will receive more requests than peers with low upload capacity and hence this will increase the savings, since the probability of having peers falling back on the streaming server for requested data content decreases.

Thus, for the embodiment of the invention using a selection policy where the nearest peer is selected for receiving a download request when considering the joint probability $p(u, d_i)$, and further prioritization of upload capacity is made, the expected probability of successful download, $P_s(d_i)$, can be calculated in line with what previously has been discussed using that concluded in Equation (12).

As previously has been discussed, the concept of multiple requests is introduced throughout the embodiments of the present invention. Thus, if for any reason a download request cannot be satisfied by a neighbouring peer, the entering peer will send the download request to another one of the neighbouring peers (included on the list of k selected network peers provided by the tracker in embodiments of the present invention). If this particular neighbouring peer does not have available bandwidth, the entering peer will send the download request to a further neighbouring peer included on the list of selected network peers, and so on, until the entering peer is considered to have depleted its requests, whereupon it will fall back on the streaming source for the requested content. In practice, the tracker will have to stipulate an upper limit for the number of download requests that can be made to different neighbouring peers, as the delay from the time of sending the first download request to the point in time when the requested content actually can be rendered by the entering peer may become unacceptably long.

When multiple requests for downloading content is made, it can be assumed that the download request made to the selected neighbouring peer in the respective one of the previously described embodiments constitutes a first round of download requesting. If the selected neighbouring peer is prevented from uploading the requested data content to the requesting peer, either due to lack of free upload capacity or possibly due to the selected peer not being positioned upstream from the requesting peer in the P2P network, at least one further download request will be made to another neighbouring peer in the second aspect of the present invention, i.e. a second round of download requesting will be undertaken. In the first aspect of the present invention, where a single stripe is downloaded from each selected peers, even further download requests must be submitted.

Typically, a maximum allowed number of download request that can be made will be determined in advance, or possibly on-the-fly if P2P network rules accepts such an approach. Hence, further rounds of download requesting to neighbouring peers will be made, either until the requested content actually can be formed from the stripes uploaded to the requesting peer, or until the maximum number of allowable requests have been reached, in which case the requesting peer must fall back on the streaming source for content download, which is generally undesirable.

All peer selection policies of the previously described embodiments allow for multiple requesting to be made, except for the embodiments where the selected peer from which to download content is the peer being arranged at the level closest to that of the entering peer, which has to be updated to handle multiple requests. This is because of bias selection from the list of k neighbouring peers provided by the tracker in accordance with preference on selecting the closest upstream peer, which will affect the distribution of the k−1 remaining peers on the list, which violates assumptions made when previously calculating the probability $\rho_{ij}^c$. This will be set out in detail in the following.

Total probability mass between levels $d_i$ and $d_j$ is defined as $\eta_{i,j}$:

$$\eta_{i,j} = \sum_{w=j+1}^{i-1} p(d_{ui})$$

The probability that a peer at level $d_i$ will have a neighbor(s) in the $\eta_{i,j}$ region given that it has c neighbors in the $\alpha_i$ region is given by:

$$X_{i,j}^c(a) = \binom{c}{a} \left(\frac{\eta_{i,j}}{p_{a_i}}\right)^a \left(1 - \frac{\eta_{i,j}}{p_{a_i}}\right)^{c-a}$$

The probability that a peer at level $d_i$ will have v neighbouring peers out of totally c-a neighbouring peers at level $d_j$, given that it has c neighbouring peers in the $\alpha_i$ region is given by:

$$Q_j^c(a,v) = \binom{c-a}{v}\left(\frac{p(d_j)}{p_{a_{j+1}}}\right)^v\left(1-\frac{p(d_j)}{p_{a_{j+1}}}\right)^{c-a-v}$$

Further:

$$\rho_{i,j}^{x,c} = \sum_{a=0}^{x-1}\left[X_{i,j}^c(a)\left(\sum_{v=x-a}^{c-a} Q_j^c(a,v)\right)\right] \quad (13)$$

$$\rho_{i,j}^x = \frac{\sum_{c=x}^{k}\binom{k}{c}(p_{\alpha_i})^c(1-p_{\alpha_i})^{k-c}\rho_{i,j}^{x,c}}{\sum_{j=1}^{\infty}\left(\sum_{c=x}^{k}\binom{k}{c}(p_{\alpha_i})^c(1-p_{\alpha_i})^{k-c}\rho_{i,j}^{x,c}\right)}$$

Due to the complexity in the calculation of Equation (13), an alternative recursive formula is suggested in order to reduce the computation complexity. A recursive formula of x for $\rho_{ij}^c$ reads:

$$\rho_{i,j}^{x+1,c} = \sum_{a=0}^{x}\left[X_{i,j}^c(a)\left(\sum_{v=x-a+1}^{c-a} Q_j^c(a,v)\right)\right]$$

$$\rho_{i,j}^{x+1,c} = \sum_{a=0}^{x}\left[X_{i,j}^c(a)\left(-Q_j^c(a,x-a)+\sum_{v=x-a}^{c-a} Q_j^c(a,v)\right)\right]$$

$$\rho_{i,j}^{x+1,c} = \sum_{a=0}^{x}X_{i,j}^c(a)Q_j^c(a,x-a)+\sum_{a=0}^{x}X_{i,j}^c(a)\sum_{v=x-a}^{c-a}Q_j^c(a,v)$$

$$\rho_{i,j}^{x+1,c} = -\sum_{a=0}^{x}X_{i,j}^c(a)Q_j^c(a,x-a)+$$

$$X_{i,j}^c(x)\sum_{v=0}^{c-a}Q_j^c(a,v)+\sum_{a=0}^{x-1}X_{i,j}^c(a)\sum_{v=x-a}^{c-a}Q_j^c(a,v)$$

$$\sum_{v=0}^{c-a}Q_j^c(a,v)=1$$

$$\rho_{i,j}^{x+1,c} = -\sum_{a=0}^{x}X_{i,j}^c(a)Q_j^c(a,x-a)+X_{i,j}^c(x)+\rho_{i,j}^{x,c}$$

Note that $X_{ij}^c(a)$ not is a function of x, so it will be used for all iterations and calculated once.

Let $$W_{i,j}^{x,c}(a) = X_{i,j}^c(a)Q_j^c(a,x-a)$$

$$W_{i,j}^{x,c} = \sum_{a=0}^{x}X_{i,j}^c(a)Q_j^c(a,x-a)$$

$$\rho_{i,j}^{x+1,c} = \rho_{i,j}^{x,c} - \sum_{a=0}^{x}W_{i,j}^{x,c}(a)+X_{i,j}^c(x)$$

The aim is to find a recursive formula of x for $W_{i,j}^{x,c}(a)$.

Let $$\lambda_j = \frac{p(d_j)}{p_{a_{j+1}}}$$

$$W_{i,j}^{x,c} = \sum_{a=0}^{x}X_{i,j}^c(a)\binom{c-a}{x-a}(\lambda_j)^{x-a}(1-\lambda_j)^{c-x}$$

$$W_{i,j}^{x+1,c} = \sum_{a=0}^{x+1}X_{i,j}^c(a)\binom{c-a}{x+1-a}(\lambda_j)^{x+1-a}(1-\lambda_j)^{c-x-1}$$

$$W_{i,j}^{x+1,c} =$$

$$\sum_{a=0}^{x}X_{i,j}^c(a)\binom{c-a}{x+1-a}(\lambda_j)^{x+1-a}(1-\lambda_j)^{c-x-1}+X_{i,j}^c(x+1)(1-\lambda_j)^{c-x-1}$$

Factorial operation results in:

$$W_{i,j}^{x+1,c} = \sum_{a=0}^{x}X_{i,j}^c(a)\binom{c-a}{x-a}(\lambda_j)^{x-a}(1-\lambda_j)^{c-x}\left(\frac{\lambda_j}{1-\lambda_j}\right)\frac{c-x}{x-a+1}+$$

$$X_{i,j}^c(x+1)(1-\lambda_j)^{c-x-1}$$

$$W_{i,j}^{x+1,c} = \sum_{a=0}^{x}W_{i,j}^{x,c}(a)\times\left(\frac{\lambda_j}{1-\lambda_j}\right)\frac{c-x}{x-a+1}+X_{i,j}^c(x+1)(1-\lambda_j)^{c-x-1}$$

Thus $$W_{i,j}^{x+1,c}(a) = \begin{cases} W_{i,j}^{x,c}(a)\times\left(\frac{\lambda_j}{1-\lambda_j}\right)\frac{c-x}{x-a+1} & a \leq x \\ X_{i,j}^c(x+1)(1-\lambda_j)^{c-x-1} & a = x+1 \end{cases}$$

Accordingly, a download request will comply with:

$$R_{iju}^x = \begin{cases} Np_i^x\rho_{iju}^x & \text{if } j \leq i-\delta \\ 0 & \text{otherwise} \end{cases}$$

where $$\rho_{iju}^x = \rho_{ij}^x\frac{p(u,d_j)}{p(d_j)}$$

Modifying Equation (12) to handle multiple download requests in case of a nearest-upstream peer selection policy results in:

$$R_{iju}^x = \begin{cases} Np_i^x\hat{\rho}_{iju}^x & \text{if } j \leq i-\delta \\ 0 & \text{otherwise,} \end{cases}$$

where $$\hat{\rho}_{iju}^x = \rho_{ij}^x\frac{u\ p(u,d_j)}{\sum_u u\ p(d_j)}.$$

For a given level $d_i$, the probability of having at least r neighbouring peers in the $\alpha_i$ region is:

$$B_i(r) = \sum_{l=r}^{k}\binom{k}{l}(p_{\alpha_i})^l(1-p_{\alpha_i})^{k-l}$$

$$p_{\alpha_i} = \sum_{w=0}^{i-\delta} p(d_w)$$

In the first round of requesting download of content data, at each level $d_i$ there are $N_i = p(d_i)N$ peers and of those peers, $N_{pi}^1 = B_i(1)N_i$ peers will make a download request to neighbouring peers that are closer to the streaming source than the peers at level $d_i$.

Then, those $N_{pi}^1$ requesting peers will make $$R_{iju}^1 = \frac{p(u, d_j)}{p_i} N_{pi}^1$$

requests for data content from peers at level $d_j$, where $j \leq i-\delta$.

As previously has been described, the expected number of successful responses that peers at level $d_j$ and upload capacity u make to download requests from neighbouring peers (i.e. the load on peers at level d and upload capacity u) is:

$$L_{ju} = \left( \sum_{l=1}^{u} l B_{ju}(l) + u \left( 1 - \sum_{l=0}^{u} B_{ju}(l) \right) \right) N_{ju}$$

where the total number of download requests that neighbouring peers make to peers at level $d_j$ and bandwidth u is:

$$R_{ju} = \Sigma_i R_{iju}^1.$$

The expected number of successful download requests from peers at level $d_i$ to peers at the lower level $d_j$ will hence be $$S_{iju}^1 = L_{ju}^1 \frac{R_{iju}^1}{R_{ju}^1}, \quad S_i^1 = \sum_j \sum_u S_{iju}^1$$

In a second round of download requesting, $N_{pi}^2 = B_i(2)(N_i - S_i^1)$ peers will make a download request to neighbouring peers that are closer to the streaming source than the peers at level $d_i$. Then, those $N_{pi}^2$ requesting peers will make $$R_{iju}^2 = \frac{p(u, d_j)}{p_i} N_{pi}^2$$

requests for data content from peers at level $d_j$. Thus, the total number of download requests that neighbouring peers make to peers at level $d_j$ and bandwidth u is:

$$R_{ju} = \Sigma_i R_{iju}^1 + \Sigma_i R_{iju}^2,$$

and the expected number of successful download requests from peers at level $d_i$ to peers at the lower level $d_j$ will hence be $$S_{iju}^2 = (L_{ju}^2 - L_{ju}^1) \frac{R_{iju}^2}{R_{ju}^2}, \quad S_i^2 = \sum_j \sum_u S_{iju}^2$$

In a third round of download requesting, $N_{pi}^3 = B_i(3)(N_i - S_i^1 - S_i^2)$ peers will make a download request to neighbouring peers that are closer to the streaming source than the peers at level $d_i$, and so on until either a sufficient number of stripes has been successfully downloaded such that the requested data content can be formed from the downloaded stripes, or the maximum number of download attempts have been reached (i.e. either the neighbouring peers have been depleted or a predetermined maximum number has been reached), wherein the streaming source will have to upload the remaining stripes needed to assemble the requested data content.

Thus, by allowing multiple download attempts directed to neighbouring peers, in case a selected neighbouring peer is prevented from uploading the requested data content, either due to exceeded latency requirements (i.e. due to a non-upstream position in the network with respect to the requesting peer) or due to lack of free upload capacity, a further neighbouring peer is approached and a download request is made to the further neighbouring peer. Should the further neighbouring peer be prevented from uploading the requested stripe(s), still a further neighbouring peer is approached, and so on. This will ultimately increase the expected probability that an entering peer actually will download the requested data content from any one of the k neighbouring peers on the list provided by the tracker. Analogously, the risk of having the entering peer fall back on the streaming server for requested data decreases, and the savings are consequently increased. Further, as can be deducted from the calculations in the above, the streaming source savings can be estimated a priori, which is highly advantageous when planning and organizing a P2P network.

In analogy with Equation (8), the expected savings for the multiple rounds of requesting can be expressed as:

$$\text{savings} = \frac{\sum_j \sum_u L_{ju}^x}{N}$$

In the first aspect of the present invention, where the requesting peer requests a single stripe from a neighbouring peer before moving on to a next peer for a next stripe until a sufficient number of stripes have been downloaded, the calculation of the expected savings is slightly modified. Hence, if a request is accepted only one stripe is downloaded even if the uploading peer has enough bandwidth to upload more than one stripe. Advantageously, diversity is attained for each stripe for each peer instead of having all the stripes from one source.

The variable $N_{i,z}^x$ defined to describe the number peers at level i who needs z stripes at round x as follows:

$$N_{i,z}^0 = \begin{cases} N_i & \text{if } z = s \\ 0 & \text{otherwise,} \end{cases}$$

$$N_{i,z}^x = \frac{S_i^{x-1}}{\sum_{z=1}^{s} N_{i,z}^{x-1}} N_{i,z+1}^{x-1} \left( 1 - \frac{S_i^{x-1}}{\sum_{z=1}^{s} N_{i,z}^{x-1}} \right) N_{i,z}^{x-1}$$

To calculate the number of peers that will be able to request, the requesting peers that have depleted their neighbouring peers must first be removed regardless if their requests for stripes to download have been fully satisfied or not. Hence, these requesting peers are excluded, and their percentage is defined by:

$$\tau_i^x = \binom{k}{x-1}(p_{a_i})^{x-1}(1-p_{a_i})^{k-(x-1)}$$

Consequently, $N_i \times \tau_i^x$ peers will be excluded from the current number $N_{i,z}^x$ of peers at level i. The remaining peers will be:

$$N_{i,z}^x \leftarrow N_{i,z}^x \left(1 - \frac{N_i \tau_i^x}{\sum_{z=0}^{s} N_{i,z}^x}\right)$$

In analogy with Equation (8), the expected savings for the multiple rounds of requesting according to the first aspect of the present invention can be expressed as:

$$\text{savings} = \frac{\sum_j \sum_u L_{j,u}^x}{s \times N}$$

In the second aspect of the present invention, where the requesting peer requests as many stripes as possible from a first neighbouring peer before moving on to a next peer in case the first neighbouring peer was depleted, the calculation of the expected savings is again slightly modified. Hence, each requesting peer will attempt to download all the requested stripes from the first peer it finds available, i.e. each request will be for all stripes that the requesting peer needs. Advantageously, playback delay is reduced at the requesting peer.

The variable $N_{i,z}^x$ is defined to describe the number peers at level i who needs stripes at round x as follows:

$$N_{i,z}^0 = \begin{cases} N_i & \text{if } z = s \\ 0 & \text{otherwise,} \end{cases}$$

$$N_{i,z}^x = N_{i,z}^{x-1} + \sum_{r=z+1}^{s} S_i^{x-1,r,r-z} - \sum_{e=1}^{z} S_i^{x-1,z,e}$$

where $S_i^{x,z,y}$ is the number of peers that made a request at round x requesting z stripes but only was granted $\gamma$; $\gamma \leq z$. Similar to the first aspect of the present invention, peers will be excluded and the remaining peers will be:

$$N_{i,z}^x \leftarrow N_{i,z}^x \left(1 - \frac{N_i \tau_i^x}{\sum_{z=0}^{s} N_{i,z}^x}\right)$$

The number of download requests at round x is denoted $R_{j,u}^x$. Initially, the probability that a peer has $\bar{u}$ available stripes is represented by $P_{j,u}^{x,\bar{u}}$ and at x=0, the following holds: $P_{j,u}^{0,0}=0, \ldots, P_{j,u}^{0,u-1}=0, \ldots, P_{j,u}^{0,u}=1$. When $R_{j,u}^1$ are received, the following is calculated:

$$\bar{R}_{j,u}^{x,\bar{u}} = P_{j,u}^{x-1,\bar{u}} R_{j,u}^x$$

Now, for each value of $\bar{u}$, the probability that a peer with a residual capacity it $\bar{u}$ will receive l requests at round x is calculated:

$$B_{j,u}^{x,\bar{u}}(l) = P_{j,u}^{x-1,\bar{u}} \left(\binom{\bar{R}_{j,u}^x}{l}\left(\frac{1}{N_{j,u}}\right)^l \left(1-\frac{1}{N_{j,u}}\right)^{\bar{R}_{j,u}^x}\right)$$

The probability that peers with residual capacity $\bar{u}$ will end up with residual capacity of $\hat{u}$, after having received $R^{x,\bar{u}}$ requests, where $\hat{u} \leq \bar{u}$, is $P_{j,u}^{x,\bar{u},\hat{u}}$, is calculated as:

$$P_{j,u}^{x,\bar{u},\hat{u}} = \begin{cases} B_{j,u}^{x,\bar{u}}(\bar{u}-\hat{u}) & \forall\, 1 \leq \hat{u} < \bar{u} \\ 1 - \sum_{l=0}^{\bar{u}-1} B_{j,u}^{x,\bar{u}}(l) & \hat{u} = 0 \end{cases}$$

Moreover:

$$P_{j,u}^{x,\bar{u}} = \sum_{m=1}^{u} P_{j,u}^{x,m,\bar{u}}$$

At each round x, it is desirable to calculate the number of request that will be satisfied. Peers with a residual upload capacity of u will satisfy the following number of requests:

$$L_{j,u}^{x,\bar{u}} = \left(\sum_{l=1}^{\bar{u}} l B_{j,u}^{x,\bar{u}}(l) + \bar{u}\left(1 - \sum_{l=0}^{\bar{u}} B_{j,u}^{x,\bar{u}}(l)\right)\right) N_{j,u}$$

It should be noted that this equation calculating the successful number of requests assumes that l requests into l stripes, one for each request. Therefore:

$$L_{j,u}^x = \sum_{m=1}^{u} L_{j,u}^{x,m}$$

As can be deducted from the above, $R_j^x$ requests go to peers at level j. Those $R_j$ requests are submitted to a group of peers generally having different upload capacities u. Each group of peers with capacity u receives $R_{j,u}$ requests. The number of peers with capacity u is $N_{j,u}$. A request could be for 1 to s stripes (s is the total number of requested stripes) depending on whether download requests are submitted according to the first or the second aspect of the present invention. Thus, $R_{j,u}^{x,z}$ requests go to peers at level j in round x having upload capacity u, where a request is made for z stripes. The $N_{j,u}$ peers are further divided into groups where within each group the residual capacity of a peer is $N_{j,u}^{x,\bar{u}}$, which can be calculated as:

$$N_{j,u}^{x,\bar{u}} = P_{j,u}^{x-1,\bar{u}} N_{j,u}$$

where $P_{j,u}^{x,\bar{u}}$ is the probability that a given peer with latency j and upload capacity u will have a residual capacity of $\bar{u}$ after round x-1.

It should be realized that the requests not necessarily are for the same number of stripes, which is due to the previously partially satisfied requests. The probability that any given request will be for z stripes is hence $$q_{j,u}^{x,z} = \frac{\overline{R}_{j,u}^{x,z}}{\overline{R}_{j,u}^{x}}$$

where $$\overline{R}_{j,u}^{x} = \Sigma_{z=1}^{x} \overline{R}_{j,u}^{x,z}$$

This probability will hold for any group with residual capacity $\bar{u}$. If a peer with properties j, u, $\bar{u}$ recieve l requests, where each of those requests is for $m_w$ stripes, a function can be formed to calculate how many requests will receive γ stripes.

In case of l requests, the expected number of requests for stripes that partially was fulfilled by γ stripes can be calculated:

$$E_{j,u}^{x,\bar{u},z,\gamma}(l) = \sum_{m_1=1}^{s} \cdots \sum_{m_l=1}^{s} g_{z,\gamma}(M,\bar{u}) \prod_{r \in \{m_1,\ldots,m_l\}} q_{j,u}^{x,r}$$

where $M=[m_1, \ldots, m_l]$.

The function $g_{z,\gamma}(M,u)$ follows algorithm:

```
input: m_l,z,γ,u
begin
 |  T = find(m_l = z)
 |  L = argmin_k(Σ_{t∈{m_1...m_k}} m_t ≤ u)
 |  if L + 1 ∈ T and Σ_{t∈{m_1...m_L}} m_t - u = γ return 1
 |  if γ = z return sum(T ≤ L)
 |  else return 0
end
```

The expected number of requests for z stripes that receive γ stripes is $$L_{j,u}^{x,\bar{u},z,\gamma} = \left( \sum_{l=1}^{\bar{u}} E_{j,u}^{x,\bar{u},z,\gamma}(l) B_{j,u}^{x,\bar{u}}(l) + E_{j,u}^{x,\bar{u},z,\gamma}(\bar{u}) \left( P_{j,u}^{x-1,\bar{u}} \cdots \sum_{l=0}^{\bar{u}} B_{j,u}^{x,\bar{u}}(l) \right) \right) N_{j,u}$$

$$L_{j,u}^{x,z,\gamma} = \sum_{\bar{u}'s} L_{j,u}^{x,\bar{u},z,\gamma}$$

For l requests, where $1 \leq \bar{u}$ the expected bandwidth load will be given by $$W_{j,u}^{x,\bar{u}}(l) = \sum_{z=1}^{s} \sum_{\gamma=1}^{z} \gamma E_{j,u}^{x,\bar{u},z,\gamma}(l)$$

where the residual capacity is $$\hat{u}(l) = \bar{u} - W_{j,u}^{x,\bar{u}}(l)$$

The probability of being assigned the residual capacity is hence:

$$P_{j,u}^{x,\bar{u},\hat{u}(l)} = B_{j,u}^{x,\bar{u}}(l)$$

In analogy with Equation (8), the expected savings for the multiple rounds of requesting according to the second aspect of the present invention can be expressed as:

$$\text{savings} = \frac{\sum_j \sum_u \sum_x \sum_z \sum_\gamma \gamma L_{j,u}^{x,z,y}}{s \times N}$$

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method at a tracker device, comprising a processing unit and a non-transitory computer readable medium, of arranging a peer-to-peer (P2P) network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the method comprising:
   instructing, by the tracker device, a network peer device requesting to download data content to download a single content sub-stream from a respective one of selected network peer devices being arranged at a distribution level closer to the streaming source than the requesting network peer device until a number of content sub-streams have been downloaded by the requesting network peer device from which the requested data content can be formed, wherein each selected network peer device has a smaller latency than the requesting network peer device.

2. A method at a tracker device, comprising a processing unit and a non-transitory computer readable medium, of arranging a peer-to-peer P2P network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the method comprising:
   instructing, by the tracker device, a network peer device requesting to download data content to download as many content sub-streams as possible required to form the requested data content from one of selected network peer devices being arranged at a distribution level closer to the streaming source than the requesting network peer device, wherein each selected network peer device has a smaller latency than the requesting network peer device;
   receiving, by the tracker device, a determination of a number of sub-streams that cannot be downloaded from said one of the selected network peer devices; and
   on a condition, based on the determination of the number of sub-streams, that a sufficient number of sub-streams cannot be downloaded from said one of the selected network peer devices, instructing, by the tracker device, the requesting network peer device to download remaining sub-streams required to form the requested data content from a further one or more of the selected network peer devices being arranged at a distribution level closer to the streaming source than the requesting network peer device, wherein said further one or more of the selected network peer devices is depleted of requested sub-streams before a request is made to yet a further one of the selected network peer devices.

3. The method of any one of claim 1 or 2, further comprising determining, by the tracker device, a distribution level in the P2P network at which the requesting peer device is to be arranged with respect to the streaming source upon receipt of a download request from the requesting peer device; and
providing, by the tracker device, the requesting peer device with a list containing the selected network peer devices from which the requested data content can be downloaded with an expected probability depending on the determined distribution level, wherein the requesting peer device is enabled to download, with the expected probability, the requested data content from the selected network peer devices.

4. The method of claim 3, wherein the probability that the requesting peer device is capable of downloading the requested data content from the selected network peer devices is determined on the basis of a joint probability of distribution level and upload capacity, which joint probability further is weighted with the upload capacity of each of the selected network peer devices.

5. The method of claim 3, further comprising:
estimating, by the tracker device, streaming source savings based on the expected probability that the requesting peer device is able to download the requested data content.

6. The method of claim 5, wherein the estimated streaming source savings are determined as a sum of expected probabilities that the network peer devices are able to download a requested data content.

7. The method of claim 3, wherein the step of determining a distribution level comprises:
sampling, by the tracker device, the determined distribution level from a conditional probability distribution of distribution level and upload capacity for the network peer devices.

8. The method of claim 1 or 2, wherein the requesting peer device is enabled to request the data content from the selected network peer devices either until the requested data content can be formed from downloaded sub-streams or a predetermined number of allowable data content requests is reached, in which case the requesting peer device is instructed to turn to the streaming source for downloading the remaining sub-streams required to form the requested data content.

9. The method of claim 1 or 2, further comprising the step of receiving, by the tracker device, an indication of upload capacity of the requesting peer device.

10. The method of claim 1 or 2, wherein the selected network peer devices are network peer devices arranged at a distribution level lower than that determined for the requesting peer device.

11. The method of claim 1 or 2, wherein the selected network peer devices are network peer devices having been connected to the network less than a predetermined time period.

12. The method of claim 1 or 2, the selected network peer devices are selected at random from the network peer devices.

13. The method of claim 1 or 2, wherein the requesting peer device is instructed to send download requests to random peer devices of the selected network peer devices.

14. The method of claim 1 or 2, further comprising:
providing, by the tracker device, the requesting peer device with upload capacity of each of the selected network peer devices, wherein the requesting peer device is instructed to send download requests to peer devices having highest upload capacity of the selected network peer devices.

15. The method of claim 14, further comprising:
providing, by the tracker device, the requesting peer device with an indication of a distribution level at which each of the selected network peer devices is arranged, wherein in case two or more of the selected network peer devices have the same upload capacity, the requesting peer device is instructed to send download requests to the one of the two or more peer devices being arranged at a distribution level closest to that determined for the requesting peer device.

16. The method of claim 1 or 2, further comprising:
providing, by the tracker device, the requesting peer device with a distribution level at which each of the selected network peer devices is arranged, wherein the requesting peer device is instructed to send download requests to peer devices of the selected peer devices being arranged at a distribution level closest to that determined for the requesting peer device.

17. The method of claim 16, further comprising:
providing, by the tracker device, the requesting peer device with upload capacity of each of the selected network peer devices, wherein in case two or more of the selected network peer devices are arranged at the same distribution level, the requesting peer device is instructed to send download requests to the one of the two or more peer devices having highest upload capacity.

18. The method of claim 1 or 2, wherein the estimated streaming source savings are calculated as the ratio of successful network peer device downloads to total number of network peer devices.

19. A method at a network peer device, comprising a processing unit and a non-transitory computer readable medium, of requesting data content in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the method comprising:
sending, from the network peer device requesting to download data content, a request to download a single content sub-stream from a respective one of selected network peer devices being arranged at a distribution level closer to the streaming source than the requesting network peer device until a number of content sub-streams have been downloaded by the requesting network peer device from which the requested data content can be formed, wherein each selected network peer device has a smaller latency than the requesting network peer device.

20. A method at a network peer device, comprising a processing unit and a non-transitory computer readable medium, of requesting data content in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the method comprising:

sending, from the network peer device requesting to download data content, a request to download as many content sub-streams as possible required to form the requested data content from one of selected network peer devices being arranged at a distribution level closer to the streaming source than the requesting network peer device, wherein each selected network peer device has a smaller latency than the requesting network peer device;

determining, by the requesting network peer device, a number of sub-streams that cannot be downloaded from said one of the selected network peer devices;

transmitting, by the requesting network peer device, the determination of a number of sub-streams that cannot be downloaded from said one of the selected network peer devices; and sending, from the requesting network peer device, a request to download remaining sub-streams required to form the requested data content to a further one or more of the network peer devices being arranged at a distribution level closer to the streaming source than the requesting network peer device, wherein said further one or more of the selected network peer devices is depleted of requested sub-streams before a request is made to yet a further one of the selected network peer devices.

21. The method of any one of claim 19 or 20, further comprising receiving, by the network peer device, an indication of a distribution level in the P2P network at which the requesting peer device is to be arranged with respect to the streaming source, and receiving, by the network peer device, a list containing the selected network peer devices from which the requested data content can be downloaded with an expected probability depending on the determined distribution level, wherein the requesting peer device is enabled to download, with the expected probability, the requested data content from the selected network peer devices.

22. The method of claim 19 or 20, further comprising:

sending, from the network peer device, a request to download the data content from the selected network peer devices either until the requested data content can be formed from downloaded sub-streams or a predetermined number of allowable data content requests is reached, in which case the requesting peer device is instructed to turn to the streaming source for downloading the remaining sub-streams required to form the requested data content.

23. The method of claim 19 or 20, further comprising:

sending, from the network peer device, the download requests at random to peer devices of the selected network peer devices.

24. The method of claim 19 or 20, further comprising:

receiving, by the network peer device, upload capacity of each of the selected network peer devices, and sending, from the network peer device, download requests to peer devices having highest upload capacity of the selected network peer devices.

25. The method of claim 24, further comprising:

receiving, by the network peer device, an indication of a distribution level at which each of the selected network peer devices is arranged, and wherein in case two or more of the selected network peer devices have the same upload capacity, sending, from the network peer device, download requests to the one of the two or more peer devices being arranged at a distribution level closest to that determined for the requesting peer device.

26. The method of claim 19 or 20, further comprising:

receiving, by the network peer device, an indication of a distribution level at which each of the selected network peer devices is arranged, and sending, from the network peer device, download requests to peer devices of the selected peer devices being arranged at a distribution level closest to that determined for the requesting peer device.

27. The method of claim 26, further comprising:

receiving, by the network peer device, an indication of upload capacity of each of the selected network peer devices, and wherein in case two or more of the selected network peer devices are arranged at the same distribution level, sending, from the network peer device, download requests to the one of the two or more peer devices having highest upload capacity.

28. A non-transitory computer readable medium, the computer readable medium having processor-executable instructions stored thereon, which when executed by at least one processing unit, will cause the at least one processing unit to perform at least parts of the steps recited in any one of claims 2-27 when the processor-executable instructions are executed on the at least one processing unit and the non-transitory computer readable medium included in a device.

29. A tracker device for arranging peer devices in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices the tracker device comprising a processing unit and a non-transitory computer readable medium being arranged to:

instruct a network peer device requesting to download data content to download a single content sub-stream from a respective one of selected network peer devices being arranged at a distribution level closer to the streaming source than the requesting network peer device until a number of content sub-streams have been downloaded by the requesting network peer device from which the requested data content can be formed, wherein each selected network peer device has a smaller latency than the requesting network peer device.

30. A tracker device for arranging peer devices in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices the tracker device comprising a processing unit and a non-transitory computer readable medium being arranged to:
  instruct a network peer device requesting to download data content to download as many content sub-streams as possible required to form the requested data content from one of selected network peer devices being arranged at a distribution level closer to the streaming source than the requesting network peer device, wherein each selected network peer device has a smaller latency than the requesting network peer device;
  receive a determination of a number of sub-streams that cannot be downloaded from said one of the selected network peer devices; and
  on a condition, based on the determination of the number of sub-streams, that a sufficient number of sub-streams cannot be downloaded from said one of the selected network peer devices, instruct the requesting network peer device to download remaining sub-streams required to form the requested data content from a further one or more of the selected network peer devices being arranged at a distribution level closer to the streaming source than the requesting network peer device, wherein said further one of the selected network peer devices is depleted of requested sub-streams before a request is made to yet a further one of the selected network peer devices.

31. The tracker device of any one of claim 29 or 30, the processing unit and the non-transitory computer readable medium further being arranged to:
  determine a distribution level in the P2P network at which the requesting peer device is to be arranged with respect to the streaming source upon receipt of a download request from the requesting peer device, and
  provide the requesting peer device with a list containing the selected network peer devices from which the requested data content can be downloaded with an expected probability depending on the determined distribution level, wherein the requesting peer device is enabled to download, with the expected probability, the requested data content from the selected network peer devices.

32. The tracker device of claim 31, wherein the probability that the requesting peer device is capable of downloading the requested data content from the selected network peer devices is determined on the basis of a joint probability of distribution level and upload capacity, which joint probability further is weighted with the upload capacity of each of the selected network peer devices.

33. The tracker device of claim 31, the processing unit and the non-transitory computer readable medium further being arranged to:
  estimate streaming source savings based on the expected probability that the requesting peer device is able to download the requested data content.

34. The tracker device of claim 33, wherein the estimated streaming source savings are determined as a sum of expected probabilities that the network peer devices are able to download a requested data content.

35. The tracker device of claim 31, the processing unit and the non-transitory computer readable medium further being arranged to:
  sample the determined distribution level from a conditional probability distribution of distribution level and upload capacity for the network peer devices.

36. The tracker device of claim 29 or 30, the processing unit and the non-transitory computer readable medium further being arranged to:
  enable the requesting peer device to request the data content from the selected network peer devices either until the requested data content can be formed from downloaded sub-streams or a predetermined number of allowable data content requests is reached, in which case the requesting peer device is instructed to turn to the streaming source for downloading the remaining sub-streams required to form the requested data content.

37. The tracker device of claim 29 or 30, the processing unit and the non-transitory computer readable medium further being arranged to: receive an indication of upload capacity of the requesting peer device.

38. The tracker device of claim 29 or 30, the processing unit and the non-transitory computer readable medium further being arranged to:
  elect the selected network peer devices from network peer devices arranged at a distribution level lower than that determined for the requesting peer device.

39. The tracker device of claim 29 or 30, the processing unit and the non-transitory computer readable medium further being arranged to:
  elect the selected network peer devices from network peer devices having been connected to the network less than a predetermined time period.

40. The tracker device of claim 29 or 30, the processing unit and the non-transitory computer readable medium further being arranged to:
  elect the selected network peer devices at random from the network peer devices.

41. The tracker device of claim 29 or 30, the processing unit and the non-transitory computer readable medium further being arranged to:
  instruct the requesting peer device to send download requests to random peer devices of the selected network peer devices.

42. The tracker device of any one of claim 29 or 30, the processing unit and the non-transitory computer readable medium further being arranged to:
  provide the requesting peer device with upload capacity of each of the selected network peer devices, wherein the requesting peer device is instructed to send download requests to peer devices having highest upload capacity of the selected network peer devices.

43. The tracker device of claim 42, the processing unit and the non-transitory computer readable medium further being arranged to
  provide the requesting peer device with in indication of a distribution level at which each of the selected network peer devices is arranged, wherein in case two or more of the selected network peer devices have the same upload capacity, the requesting peer device is instructed to send download requests to the one of the two or more peer devices being arranged at a distribution level closest to that determined for the requesting peer device.

44. The tracker device of claim 29 or 30, the processing unit and the non-transitory computer readable medium further being arranged to:
  provide the requesting peer device with an indication of a distribution level at which each of the selected network peer devices is arranged, wherein the requesting peer device is instructed to send download requests to peer devices of the selected peer devices being arranged at a distribution level closest to that determined for the requesting peer device.

45. The tracker device of claim 29 or 30, the processing unit and the non-transitory computer readable medium further being arranged to:

calculate the estimated streaming source savings as the ratio of successful network peer device downloads to total number of network peer devices.

46. The tracker device of claim 45, the processing unit and the non-transitory computer readable medium further being arranged to:
provide the requesting peer device with upload capacity of each of the selected network peer devices, wherein in case two or more of the selected network peer devices are arranged at the same distribution level, the requesting peer device is instructed to send download requests to the one of the two or more peer devices having highest upload capacity.

47. A peer device for requesting data content in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the peer device comprising a processing unit and a non-transitory computer readable medium being arranged to:
send a request to download a single content sub-stream from a respective one of selected network peer devices being arranged at a distribution level closer to the streaming source than the requesting peer device until a number of content sub-streams have been downloaded from which the requested data content can be formed, wherein each selected network peer device has a smaller latency than the requesting network peer device.

48. A peer device for requesting data content in a peer-to-peer network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the peer device comprising a processing unit and non-transitory computer readable medium being arranged to:
send a request to download as many content sub-streams as possible required to form the requested data content from one of selected network peer devices being arranged at a distribution level closer to the streaming source than the requesting peer device, wherein each selected network peer device has a smaller latency than the requesting network peer device;
determine a number of sub-streams that cannot be downloaded from said one of the selected network peer devices;
transmit the determination of a number of sub-streams that cannot be downloaded from said one of selected network peer devices; and
send a request to download remaining sub-streams required to form the requested data content to a further one or more of the selected network peer devices being arranged at a distribution level closer to the streaming source than the requesting peer device, wherein said further one or more of the selected network peer devices is depleted of requested sub-steams before a request is made to yet a further one of the selected network peer devices.

49. The peer device of any one of claim 47 or 48, the processing unit and the non-transitory computer readable medium further being arranged to:
receive, from a network supervising entity, an indication of a distribution level in the P2P network at which the requesting peer device is to be arranged with respect to the streaming source, and
receive, from the network supervising entity, a list containing the selected network peer devices from which the requested data content can be downloaded with an expected probability depending on the determined distribution level.

50. The peer device of any one of claim 47 or 48, the processing unit and the non-transitory computer readable medium further being arranged to:
send a request to download the data content from the selected network peer devices either until the requested data content can be formed from downloaded sub-streams or a predetermined number of allowable data content requests is reached, in which case the requesting peer device is instructed to turn to the streaming source for downloading the remaining sub-streams required to form the requested data content.

51. The peer device of any one of claim 47 or 48, the processing unit and the non-transitory computer readable medium further being arranged to:
send the download requests at random to peer devices of the selected network peer devices.

52. The peer device of any one of claim 47 or 48, the processing unit and the non-transitory computer readable medium further being arranged to:
receive upload capacity of each of the selected network peer devices, and send download requests to peer devices having highest upload capacity of the selected network peer devices.

53. The peer device of claim 52, the processing unit and the non-transitory computer readable medium further being arranged to:
receive an indication of a distribution level at which each of the selected network peer devices is arranged, and wherein in case two or more of the selected network peer devices have the same upload capacity,
send download requests to the one of the two or more peer devices being arranged at a distribution level closest to that determined for the requesting peer device.

54. The peer device of any one of claim 47 or 48, the processing unit and the non-transitory computer readable medium further being arranged to:
receive an indication of a distribution level at which each of the selected network peer devices is arranged, and
send download requests to peer devices of the selected peer devices being arranged at a distribution level closest to that determined for the requesting peer device.

55. The peer device of claim 54, the processing unit and the non-transitory computer readable medium further being arranged to:
receive an indication of upload capacity of each of the selected network peer devices, and wherein in case two or more of the selected network peer devices are arranged at the same distribution level,
send download requests to the one of the two or more peer devices having highest upload capacity.

56. A non-transitory computer readable medium, the computer readable medium having processor-executable instructions stored thereon, which when executed by at least one processing unit, will cause the at least one processing unit to perform a method of arranging a peer-to-peer (P2P) network comprising a streaming source and network peer devices arranged at distribution levels in the P2P network, wherein network peer devices at distribution levels closer to the streaming source have lower latencies than network peer devices at distribution levels farther from the streaming source, and in which P2P network the streaming source is arranged to divide data content to be streamed into a plurality of content sub-streams together forming the data content and to distribute the plurality of content sub-streams to the network peer devices, the method comprising:

instructing a network peer device requesting to download data content to download a single content sub-stream from a respective one of selected network peer devices being arranged at a distribution level closer to the streaming source than the requesting network peer device until a number of content sub-streams have been downloaded by the requesting network peer device from which the requested data content can be formed, wherein each selected network peer device has a smaller latency than the requesting network peer device.

* * * * *